(12) United States Patent
Brown

(10) Patent No.: US 11,592,215 B2
(45) Date of Patent: Feb. 28, 2023

(54) INTEGRATED DEMAND WATER HEATING USING A CAPACITY MODULATED HEAT PUMP WITH DESUPERHEATER

(71) Applicant: WaterFurnace International, Inc., Fort Wayne, IN (US)

(72) Inventor: Robert R. Brown, Markle, IN (US)

(73) Assignee: WaterFurnace International, Inc., Fort Wayne, IN (US)

( * ) Notice: Subject to any disclaimer, the term of this patent is extended or adjusted under 35 U.S.C. 154(b) by 0 days.

(21) Appl. No.: 16/539,956

(22) Filed: Aug. 13, 2019

(65) Prior Publication Data
US 2020/0072510 A1 Mar. 5, 2020

Related U.S. Application Data

(60) Provisional application No. 62/724,459, filed on Aug. 29, 2018.

(51) Int. Cl.
*F25B 30/02* (2006.01)
*F25B 41/35* (2021.01)
(Continued)

(52) U.S. Cl.
CPC ............ *F25B 13/00* (2013.01); *F25B 29/003* (2013.01); *F25B 30/02* (2013.01); *F25B 40/04* (2013.01);
(Continued)

(58) Field of Classification Search
CPC ........... F25B 40/04; F25B 40/00; F25B 41/26
See application file for complete search history.

(56) References Cited

U.S. PATENT DOCUMENTS 3,460,353 A   8/1969   Ogata et al.
3,916,638 A   11/1975  Schmidt
(Continued)

FOREIGN PATENT DOCUMENTS

CA   1178268        11/1984
CN   1987397 A      6/2007
(Continued)

OTHER PUBLICATIONS

"134-XS and 134-S Series Compressors ECOnomizer (EA-12-03-E)," 134-XS and 134-S series—Application and Maintenance Manual, Technical report EA1203E, RefComp Refrigerant Compressors, undated but believed to be publicly available at least as early as Mar. 2014 (4 pages).
(Continued)

*Primary Examiner* — Nelson J Nieves
(74) *Attorney, Agent, or Firm* — Neal, Gerber & Eisenberg LLP; Thomas E. Williams

(57) ABSTRACT

A heat pump system provides at least six modes of heating, cooling, and/or domestic water heating operation, where domestic water heating may occur concurrently with heating or cooling a space in a structure. The heat pump system comprises a desuperheater positioned downstream of the compressor and operable as a desuperheater, a condenser or an evaporator, a source heat exchanger operable as either a condenser or an evaporator, a load heat exchanger operable as either a condenser or an evaporator, a reversing valve positioned downstream of the desuperheater heat exchanger and configured to alternately direct refrigerant flow from the desuperheater heat exchanger to one of the load heat exchanger and the source heat exchanger and to alternately return refrigerant flow from the other of the load heat exchanger and the source heat exchanger to the compressor,
(Continued)

and an expansion valve positioned between the load heat exchanger and the source heat exchanger.

18 Claims, 8 Drawing Sheets

(51) Int. Cl.
  *F25B 39/04* (2006.01)
  *F25B 39/02* (2006.01)
  *F25B 13/00* (2006.01)
  *F25B 29/00* (2006.01)
  *F25B 40/04* (2006.01)
  *F24H 4/02* (2022.01)

(52) U.S. Cl.
  CPC ............... *F25B 41/35* (2021.01); *F24H 4/02* (2013.01); *F25B 39/02* (2013.01); *F25B 39/04* (2013.01)

(56) References Cited

U.S. PATENT DOCUMENTS

| | | | |
|---|---|---|---|
| 3,938,352 | A | 2/1976 | Schmidt |
| 4,072,187 | A | 2/1978 | Lodge |
| 4,173,865 | A | 11/1979 | Sawyer |
| 4,179,894 | A | 12/1979 | Hughes |
| 4,299,098 | A | 11/1981 | Derosier |
| 4,399,664 | A * | 8/1983 | Derosier ................ F25B 13/00 62/238.6 |
| 4,441,901 | A | 4/1984 | Endoh |
| 4,493,193 | A | 1/1985 | Fisher |
| 4,528,822 | A | 7/1985 | Glamm |
| 4,538,418 | A | 9/1985 | Lawrence et al. |
| 4,575,001 | A | 3/1986 | Oskarsson et al. |
| 4,592,206 | A | 6/1986 | Yamazaki et al. |
| 4,598,557 | A | 7/1986 | Robinson et al. |
| 4,645,908 | A * | 2/1987 | Jones ................ F24D 11/0214 392/340 |
| 4,646,538 | A | 3/1987 | Blackshaw et al. |
| 4,685,307 | A * | 8/1987 | Jones ................ G05D 23/1917 62/160 |
| 4,693,089 | A * | 9/1987 | Bourne ............... F24D 11/0214 62/79 |
| 4,698,978 | A * | 10/1987 | Jones ...................... F25B 13/00 62/126 |
| 4,727,727 | A | 3/1988 | Reedy |
| 4,766,734 | A | 8/1988 | Dudley |
| 4,776,180 | A | 10/1988 | Patton et al. |
| 4,796,437 | A | 1/1989 | James |
| 4,798,059 | A * | 1/1989 | Morita .................. F28D 20/021 62/228.4 |
| 4,799,363 | A * | 1/1989 | Nakamura ............... F25B 13/00 62/160 |
| 4,835,976 | A | 6/1989 | Torrence |
| 4,856,578 | A | 8/1989 | McCahill |
| 4,893,476 | A | 1/1990 | Bos et al. |
| 4,909,041 | A * | 3/1990 | Jones ................ G05D 23/1902 62/99 |
| 4,920,757 | A | 5/1990 | Gazes et al. |
| 4,924,681 | A | 5/1990 | De Vit et al. |
| 4,938,032 | A | 7/1990 | Mudford |
| 5,038,580 | A | 8/1991 | Hart |
| 5,044,425 | A | 9/1991 | Tatsumi et al. |
| 5,081,848 | A | 1/1992 | Rawlings et al. |
| 5,088,296 | A | 2/1992 | Hamaoka |
| 5,099,651 | A | 3/1992 | Fischer |
| 5,105,629 | A * | 4/1992 | Parris ..................... F24F 1/022 62/278 |
| 5,136,855 | A | 8/1992 | Lenarduzzi |
| 5,172,564 | A | 12/1992 | Reedy |
| 5,187,944 | A | 2/1993 | Jarosch |
| 5,224,357 | A | 7/1993 | Galiyano et al. |
| 5,269,153 | A * | 12/1993 | Cawley ................ F24D 17/02 165/103 |
| 5,305,822 | A | 4/1994 | Kogetsu et al. |
| 5,309,732 | A | 5/1994 | Sami |
| 5,323,844 | A | 6/1994 | Sumitani et al. |
| 5,339,890 | A | 8/1994 | Rawlings |
| 5,355,688 | A | 10/1994 | Rafalovich et al. |
| 5,372,016 | A | 12/1994 | Rawlings |
| 5,438,846 | A | 8/1995 | Datta |
| 5,461,876 | A | 10/1995 | Dressier |
| 5,465,588 | A * | 11/1995 | McCahill ................ F24D 15/04 62/127 |
| 5,477,914 | A | 12/1995 | Rawlings |
| 5,497,629 | A | 3/1996 | Rafalovich et al. |
| 5,507,337 | A | 4/1996 | Rafalovich et al. |
| 5,533,355 | A | 7/1996 | Rawlings |
| 5,564,282 | A | 10/1996 | Kaye |
| 5,613,372 | A | 3/1997 | Beal et al. |
| 5,619,864 | A | 4/1997 | Reedy |
| 5,628,200 | A | 5/1997 | Pendergrass |
| 5,651,265 | A | 7/1997 | Grenier |
| 5,669,224 | A | 9/1997 | Lenarduzzi |
| 5,689,966 | A | 11/1997 | Zess et al. |
| 5,729,985 | A | 3/1998 | Yoshihara et al. |
| 5,758,514 | A | 6/1998 | Genung et al. |
| 5,802,864 | A | 9/1998 | Yarbrough et al. |
| 5,927,088 | A | 7/1999 | Shaw |
| 6,032,472 | A | 3/2000 | Heinrichs et al. |
| 6,070,423 | A | 6/2000 | Hebert |
| 6,082,125 | A | 7/2000 | Savtchenko |
| 6,123,147 | A | 9/2000 | Pittman |
| 6,149,066 | A | 11/2000 | Perry et al. |
| 6,167,715 | B1 | 1/2001 | Hebert |
| 6,212,892 | B1 * | 4/2001 | Rafalovich .............. F24F 11/77 62/90 |
| 6,227,003 | B1 | 5/2001 | Smolinsky |
| 6,253,564 | B1 | 7/2001 | Yarbrough et al. |
| 6,347,527 | B1 | 2/2002 | Bailey et al. |
| 6,385,983 | B1 | 5/2002 | Sakki et al. |
| 6,418,745 | B1 | 7/2002 | Ratliff |
| 6,434,960 | B1 | 8/2002 | Rousseau |
| 6,474,087 | B1 | 11/2002 | Lifson |
| 6,536,221 | B2 | 3/2003 | James |
| 6,655,164 | B2 | 12/2003 | Rogstam |
| 6,662,864 | B2 | 12/2003 | Burk et al. |
| 6,668,572 | B1 * | 12/2003 | Seo ...................... F24D 17/02 237/2 B |
| 6,694,750 | B1 | 2/2004 | Lifson et al. |
| 6,729,151 | B1 | 5/2004 | Thompson |
| 6,751,972 | B1 | 6/2004 | Jungwirth |
| 6,804,975 | B2 | 10/2004 | Park |
| 6,817,205 | B1 | 11/2004 | Lifson et al. |
| 6,826,921 | B1 | 12/2004 | Uselton |
| 6,857,285 | B2 | 2/2005 | Hebert |
| 6,892,553 | B1 | 5/2005 | Lifson et al. |
| 6,915,656 | B2 | 7/2005 | Ratliff |
| 6,931,879 | B1 | 8/2005 | Wiggs |
| 6,938,438 | B2 | 9/2005 | Lifson et al. |
| 6,941,770 | B1 | 9/2005 | Taras et al. |
| 7,000,423 | B2 | 2/2006 | Lifson et al. |
| 7,059,151 | B2 | 6/2006 | Taras et al. |
| 7,114,349 | B2 | 10/2006 | Lifson et al. |
| 7,150,160 | B2 | 12/2006 | Herbert |
| 7,155,922 | B2 | 1/2007 | Harmon et al. |
| 7,185,505 | B2 | 3/2007 | Kamimura |
| RE39,597 | E | 5/2007 | Rousseau |
| 7,210,303 | B2 | 5/2007 | Zhang et al. |
| 7,228,707 | B2 | 6/2007 | Lifson et al. |
| 7,234,311 | B2 | 6/2007 | Lifson et al. |
| 7,254,955 | B2 | 8/2007 | Otake et al. |
| 7,263,848 | B2 | 9/2007 | Bhatti |
| 7,272,948 | B2 | 9/2007 | Taras et al. |
| 7,275,385 | B2 | 10/2007 | Abel et al. |
| 7,325,414 | B2 | 2/2008 | Taras et al. |
| 7,454,919 | B2 * | 11/2008 | Ookoshi ................ F24D 17/02 62/156 |
| 7,484,374 | B2 | 2/2009 | Pham et al. |
| 7,617,697 | B2 | 11/2009 | McCaughan |
| 7,654,104 | B2 | 2/2010 | Groll et al. |
| 7,716,943 | B2 | 5/2010 | Seefeldt |
| 7,770,405 | B1 | 8/2010 | Dillon |

(56) References Cited

U.S. PATENT DOCUMENTS

| | | | |
|---|---|---|---|
| 7,823,404 B2 | 11/2010 | Hanson | |
| 7,845,190 B2 | 12/2010 | Pearson | |
| 7,854,137 B2 | 12/2010 | Lifson et al. | |
| 7,856,834 B2 | 12/2010 | Haley | |
| 7,913,501 B2 | 3/2011 | Ellis et al. | |
| 7,937,960 B2 | 5/2011 | Matsui | |
| 7,958,737 B2 | 6/2011 | Lifson et al. | |
| 7,975,495 B2 | 7/2011 | Voorhis et al. | |
| 7,975,506 B2 | 7/2011 | James et al. | |
| 7,997,092 B2 | 8/2011 | Lifson et al. | |
| 8,037,713 B2 | 10/2011 | Haley et al. | |
| 8,074,459 B2 | 12/2011 | Murakami et al. | |
| 8,079,228 B2 | 12/2011 | Lifson et al. | |
| 8,079,229 B2 | 12/2011 | Lifson et al. | |
| 8,082,751 B2 | 12/2011 | Wiggs | |
| 8,136,364 B2 | 3/2012 | Lifson et al. | |
| 8,191,376 B2 | 6/2012 | Fox et al. | |
| 8,220,531 B2 | 7/2012 | Murakami et al. | |
| 8,286,438 B2 * | 10/2012 | McCahill | F25B 40/04 62/98 |
| 8,418,482 B2 | 4/2013 | Bush et al. | |
| 8,418,486 B2 | 4/2013 | Taras et al. | |
| 8,424,326 B2 | 4/2013 | Mitra et al. | |
| 8,459,052 B2 | 6/2013 | Bush et al. | |
| 8,528,359 B2 | 9/2013 | Lifson et al. | |
| 8,561,425 B2 | 10/2013 | Mitra et al. | |
| 8,650,893 B2 | 2/2014 | Hanson | |
| 8,733,429 B2 | 5/2014 | Harrison et al. | |
| 8,756,943 B2 | 6/2014 | Chen et al. | |
| 8,769,982 B2 | 7/2014 | Ignatiev et al. | |
| 8,984,903 B2 | 3/2015 | Itoh et al. | |
| 9,052,125 B1 | 6/2015 | Dostal | |
| 9,562,700 B2 | 2/2017 | Watanabe | |
| 10,072,856 B1 | 9/2018 | Akin et al. | |
| 10,118,462 B2 | 11/2018 | Kohigashi et al. | |
| 10,119,738 B2 | 11/2018 | Hammond et al. | |
| 10,345,004 B1 * | 7/2019 | Hern | F25B 13/00 |
| 10,871,314 B2 * | 12/2020 | Taras | F25B 13/00 |
| 2003/0061822 A1 * | 4/2003 | Rafalovich | F25B 5/04 62/92 |
| 2003/0221436 A1 * | 12/2003 | Xu | F25B 30/06 62/260 |
| 2003/0221445 A1 | 12/2003 | Smolinsky | |
| 2006/0010908 A1 | 1/2006 | Taras et al. | |
| 2006/0218949 A1 | 10/2006 | Ellis et al. | |
| 2006/0225445 A1 | 10/2006 | Lifson et al. | |
| 2007/0074536 A1 | 4/2007 | Bai | |
| 2007/0289319 A1 | 12/2007 | Kim et al. | |
| 2007/0295477 A1 | 12/2007 | Mueller et al. | |
| 2008/0016895 A1 | 1/2008 | Kim et al. | |
| 2008/0041072 A1 | 2/2008 | Seefeldt | |
| 2008/0173034 A1 | 7/2008 | Shaw | |
| 2008/0196418 A1 | 8/2008 | Lifson et al. | |
| 2008/0197206 A1 | 8/2008 | Murakami et al. | |
| 2008/0209930 A1 | 9/2008 | Taras et al. | |
| 2008/0256975 A1 | 10/2008 | Lifson et al. | |
| 2008/0282718 A1 | 11/2008 | Beagle | |
| 2008/0296396 A1 | 12/2008 | Corroy et al. | |
| 2008/0302113 A1 | 12/2008 | Yin et al. | |
| 2008/0302118 A1 | 12/2008 | Chen et al. | |
| 2008/0302129 A1 | 12/2008 | Mosemann et al. | |
| 2008/0307813 A1 | 12/2008 | Lifson et al. | |
| 2009/0000611 A1 | 1/2009 | Kaiser | |
| 2009/0107656 A1 | 4/2009 | Marois | |
| 2009/0208331 A1 | 8/2009 | Haley et al. | |
| 2009/0294097 A1 | 12/2009 | Rini et al. | |
| 2009/0314014 A1 | 12/2009 | Ericsson | |
| 2010/0005821 A1 * | 1/2010 | McCahill | F25B 40/04 62/238.6 |
| 2010/0005831 A1 | 1/2010 | Vaisman et al. | |
| 2010/0024470 A1 | 2/2010 | Lifson et al. | |
| 2010/0058781 A1 | 3/2010 | Lifson et al. | |
| 2010/0064710 A1 | 3/2010 | Slaughter | |
| 2010/0064722 A1 | 3/2010 | Taras | |
| 2010/0077788 A1 | 4/2010 | Lewis | |
| 2010/0114384 A1 | 5/2010 | Maxwell | |
| 2010/0132399 A1 | 6/2010 | Mitra et al. | |
| 2010/0199715 A1 | 8/2010 | Lifson et al. | |
| 2010/0251750 A1 | 10/2010 | Lifson et al. | |
| 2010/0281894 A1 | 11/2010 | Huff | |
| 2010/0287969 A1 | 11/2010 | Ueda et al. | |
| 2010/0326100 A1 | 12/2010 | Taras et al. | |
| 2011/0023515 A1 | 2/2011 | Kopko et al. | |
| 2011/0036119 A1 | 2/2011 | Fujimoto et al. | |
| 2011/0041523 A1 | 2/2011 | Taras et al. | |
| 2011/0061413 A1 | 3/2011 | Setoguchi | |
| 2011/0079032 A1 | 4/2011 | Taras et al. | |
| 2011/0088426 A1 | 4/2011 | Lochtefeld | |
| 2011/0094248 A1 | 4/2011 | Taras et al. | |
| 2011/0094259 A1 | 4/2011 | Lifson et al. | |
| 2011/0132007 A1 | 6/2011 | Weyna et al. | |
| 2011/0174014 A1 | 7/2011 | Scarcella et al. | |
| 2011/0203299 A1 | 8/2011 | Jing et al. | |
| 2011/0209490 A1 | 9/2011 | Mijanovic et al. | |
| 2011/0259025 A1 | 10/2011 | Noh et al. | |
| 2011/0289950 A1 | 12/2011 | Kim et al. | |
| 2011/0289952 A1 | 12/2011 | Kim et al. | |
| 2012/0011866 A1 | 1/2012 | Scarcella et al. | |
| 2012/0067965 A1 | 3/2012 | Rajasekaran et al. | |
| 2012/0103005 A1 | 5/2012 | Kopko et al. | |
| 2012/0198867 A1 | 8/2012 | Ng et al. | |
| 2012/0205077 A1 | 8/2012 | Zinger et al. | |
| 2012/0247134 A1 | 10/2012 | Gurin | |
| 2012/0291460 A1 | 11/2012 | Aoyagi | |
| 2013/0014451 A1 | 1/2013 | Russell et al. | |
| 2013/0031934 A1 | 2/2013 | Huff et al. | |
| 2013/0098085 A1 | 4/2013 | Judge et al. | |
| 2013/0104574 A1 | 5/2013 | Dempsey et al. | |
| 2013/0180266 A1 | 7/2013 | Bois | |
| 2013/0269378 A1 | 10/2013 | Wong | |
| 2013/0305756 A1 | 11/2013 | Gomes et al. | |
| 2014/0013782 A1 | 1/2014 | Kopko et al. | |
| 2014/0013788 A1 | 1/2014 | Kopko et al. | |
| 2014/0033753 A1 | 2/2014 | Lu et al. | |
| 2014/0033755 A1 | 2/2014 | Wong | |
| 2014/0053585 A1 | 2/2014 | Huff | |
| 2014/0060101 A1 | 3/2014 | Styles et al. | |
| 2014/0123689 A1 * | 5/2014 | Ellis | F24D 15/04 62/79 |
| 2014/0245770 A1 | 9/2014 | Chen et al. | |
| 2014/0260392 A1 | 9/2014 | Hawkins et al. | |
| 2015/0052937 A1 | 2/2015 | Hung | |
| 2015/0059373 A1 | 3/2015 | Maiello et al. | |
| 2015/0204586 A1 | 7/2015 | Burg et al. | |
| 2015/0285539 A1 | 10/2015 | Kopko | |
| 2017/0010029 A9 | 1/2017 | Reytblat et al. | |
| 2017/0227250 A1 | 8/2017 | Karamanos | |
| 2018/0010829 A1 * | 1/2018 | Taras | F25B 6/04 |
| 2018/0128506 A1 | 5/2018 | Taras et al. | |
| 2018/0313555 A1 | 11/2018 | Henderson | |
| 2019/0178509 A1 | 6/2019 | Taras et al. | |
| 2020/0378667 A1 | 12/2020 | Hammond et al. | |
| 2021/0018234 A1 | 1/2021 | Lingrey et al. | |
| 2021/0095872 A1 | 4/2021 | Taras et al. | |
| 2021/0131709 A1 | 5/2021 | Taras et al. | |
| 2021/0180807 A1 | 6/2021 | Taras et al. | |

FOREIGN PATENT DOCUMENTS

| | | |
|---|---|---|
| CN | 201944952 U | 8/2011 |
| CN | 102353126 A | 2/2012 |
| CN | 203231582 U | 10/2013 |
| CN | 103471275 A | 12/2013 |
| CN | 203396155 U | 1/2014 |
| CN | 203432025 U | 2/2014 |
| EP | 134015 | 3/1985 |
| EP | 1983275 A1 | 10/2008 |
| JP | 2000046417 | 2/2000 |
| JP | 2000274786 | 10/2000 |
| JP | 2000314563 | 11/2000 |
| JP | 2001248931 | 9/2001 |
| KR | 100963221 B1 | 6/2010 |
| WO | 9600370 | 1/1996 |
| WO | 2001/90663 | 11/2001 |

(56) References Cited

FOREIGN PATENT DOCUMENTS

| WO | 2006/033782 | 3/2006 |
|---|---|---|
| WO | 2008/045086 | 4/2008 |
| WO | 2008/048252 | 4/2008 |
| WO | 2010/005918 | 1/2010 |
| WO | 2010/054498 | 5/2010 |
| WO | 2010/104709 | 9/2010 |
| WO | 2013/142760 | 9/2013 |
| WO | 2014/031559 A1 | 2/2014 |
| WO | 2014/031708 A1 | 2/2014 |

OTHER PUBLICATIONS

B.P. Rasmussen et al., "Model-Driven System Identification of Transcritical Vapor Compression Systems," IEEE Transactions on Control Systems Technology, May 2005, pp. 444-451, vol. 13 (8 pages).
"Economized Vapor Injection (EVI) Compressors," Emerson Climate Technologies Application Engineering Bulletin AE4-1327 R2, Revised Sep. 2006 (9 pages).
Ekaterina Vi Nogradova, "Economizers in Chiller Systems," Bachelor's Thesis, Mikkelin Ammattikorkeakoulu, Nov. 2012 (50 pages).
"Enhanced Vapour Injection (EVI) for ZH*KVE Scroll Compressors," Emerson Climate Technologies—Technical Information, C7.4. 3/1107-0512/E, May 2012 (10 pages).
Haraldsson et al., "Measurement of Performance and Evaluation of a Heat Pump—with Scroll Compressor EVI and Economizer," Lunds Institute of Technology, 2006 (4 pages).
John P. Elson et al., "Scroll Technology: An Overview of Past, Present and Future Developments," International Compressor Engineering Conference, 2008, Paper 1871 (9 pages).
Lund et al., "Geothermal (Ground-Source Heat Pumps—A World Overview," GHC Bulletin, Sep. 2004 (edited and updated version of the article from Renewal Energy World, (Jul.-Aug. 2003), vol. 6 No. 4) (10 pages).
Tolga N. Aynur, "Variable Refrigerant Flow Systems: A Review, Energy and Buildings," Jan. 2010, pp. 1106-1112, vol. 42 (7 pages).
Wei Yang et al., "The Design Method of U-Bend Geothermal Heat Exchanger of DX-GCHP in Cooling Model," IEEE, 2011, pp. 3635-3637 (English Abstract) (3 pages).
"Heat Pump Mechanics" http://www.geo4va.vt.edu/A3/A3. htm#A3sec3c (Accessed Apr. 20, 2011)(19pages).
"Heat pumps in residential and commercial buildings" http://www.heatpumpcentre.org/en/aboutheatpumps/heatpumpsinresidential/Sidor/default.aspx (Accessed Apr. 20, 2011) (2 pages).
Honeywell, VFF1, VFF2, VFF3, VFF6 Resilient Seat Butterfly Valves with Flanged Connections Jan. 2013, p. 1, 1st column last paragraph. (Year: 2013) (20 pages).
International Preliminary Report on Patentability issued in International Application No. PCT/US2013/033433 dated Sep. 23, 2014 (7 Pages).
International Search Report and Written Opinion issued in International Application No. PCT/US2013/033433 dated Aug. 9, 2013 (11 Pages).
Korean Intellectual Property Office, International Search Report in International Application No. PCT/US2009/049734 (dated Jan. 20, 2010) (2 pages).
Korean Intellectual Property Office, International Search Report in International Application No. PCT/US2010/026010 (dated Sep. 28, 2010) (2 pages).
Michael F. Taras, "Reheat Which Concept is Best," *ASHRAE Journal*: 35-40 (Dec. 2004) (7 pages).
Murphy et al., "Air-Source Integrated Heat Pump for Net-Zero-Energy Houses Technology Status Report," *Oak Ridge National Laboratory*, ORNL-TM-2007-112 (Jul. 2007) (93 pages).
Murphy et al., "Ground-Source Integrated Heat Pump for Net-Zero-Energy Houses Technology Status Report," *Oak Ridge National Laboratory*, ORNL-TM-2007-177 (Dec. 2007) (78 pages).
Third Party Submission dated Nov. 10, 2014 filed in U.S. Appl. No. 13/848,342 (13 Pages).

\* cited by examiner

INTEGRATED DEMAND WATER HEATING USING A CAPACITY MODULATED HEAT PUMP WITH DESUPERHEATER

CROSS-REFERENCE TO RELATED APPLICATION

This application claims the benefit of U.S. Provisional Patent Application No. 62/724,459, filed on Aug. 29, 2018. This application is incorporated herein by reference in its entirety.

TECHNICAL FIELD

This disclosure relates generally to heating, ventilation, and air conditioning systems including heat pump systems.

SUMMARY

A heat pump system is disclosed that provides at least six different modes of heating, cooling, and/or domestic water heating operation, where domestic water heating may occur concurrently with heating or cooling a space in a structure. The heat pump system may include (1) a desuperheater heat exchanger positioned downstream of the compressor and operable as a desuperheater, a condenser, or an evaporator, (2) a source heat exchanger operable as either a condenser or an evaporator, (3) a load heat exchanger operable as either a condenser or an evaporator, (4) a reversing valve positioned downstream of the desuperheater heat exchanger and configured to alternately direct refrigerant flow from the desuperheater heat exchanger to one of the load heat exchanger and the source heat exchanger and to alternately return refrigerant flow from the other of the load heat exchanger and the source heat exchanger to the compressor, and (5) an expansion valve positioned between the load heat exchanger and the source heat exchanger.

In one embodiment, a heat pump system is disclosed comprising a refrigerant circuit that fluidly interconnects: (1) a variable speed compressor; (2) a desuperheater heat exchanger positioned downstream of the compressor and operable as a desuperheater, a condenser, or an evaporator; (3) a source heat exchanger operable as either a condenser or an evaporator; (4) a load heat exchanger operable as either a condenser or an evaporator; (5) a reversing valve positioned downstream of the desuperheater heat exchanger and configured to alternately direct refrigerant flow from the desuperheater heat exchanger to one of the load heat exchanger and the source heat exchanger and to alternately return refrigerant flow from the other of the load heat exchanger and the source heat exchanger to the compressor; and (6) an expansion valve positioned between the load heat exchanger and the source heat exchanger.

In this embodiment, the load heat exchanger may be a refrigerant-to-liquid heat exchanger or a refrigerant-to-air heat exchanger. The heat pump system may include a fan driven by a variable speed motor, where the fan is configured to flow air over a portion of the load heat exchanger. The desuperheater heat exchanger may be a refrigerant-to-liquid heat exchanger configured to exchange heat between refrigerant in the refrigerant circuit and domestic water in a storage loop. The heat pump system may include a storage tank for storing heated domestic water, and a variable speed pump for circulating the domestic water in the storage loop and through the desuperheater heat exchanger. The source heat exchanger may be a refrigerant-to-liquid heat exchanger configured to exchange heat between refrigerant in the refrigerant circuit and a liquid in a source loop. The heat pump system may include a variable speed pump for circulating the liquid in the source loop and through the source heat exchanger. The expansion valve may be an electronically controlled thermostatic expansion valve.

In this embodiment, the heat pump system may include a controller comprising a processor and memory on which one or more software programs are stored, the controller configured to control operation of the reversing valve, the expansion valve, the compressor, a first variable speed pump for circulating water through the desuperheater heat exchanger, and a second variable speed pump for circulating a source liquid through the source heat exchanger.

To operate the system in a space heating mode, the controller may be configured to: (a) control the first variable speed pump to disable heat exchange in the desuperheater heat exchanger; (b) control the reversing valve to cause refrigerant flow from the desuperheater heat exchanger to the load heat exchanger acting as a condenser and to return flow from the source heat exchanger acting as an evaporator to the compressor; (c) control an opening in the expansion valve to cause refrigerant flow from the load heat exchanger, through the expansion valve, and to the source heat exchanger; and (d) control the second variable speed pump to To operate the system in a space cooling mode, the controller may be configured to: (a) control the first variable speed pump to disable heat exchange in the desuperheater heat exchanger; (b) control the reversing valve to cause refrigerant flow from the desuperheater heat exchanger to the source heat exchanger acting as a condenser and to return flow from the load heat exchanger acting as an evaporator to the compressor; (c) control an opening in the expansion valve to cause refrigerant flow from the source heat exchanger, through the expansion valve, and to the load heat exchanger; and (d) control the second variable speed pump to enable heat exchange in the source heat exchanger.

To operate the system in a space heating with desuperheater water heating mode, the controller may be configured to: (a) control the first variable speed pump to enable heat exchange in the desuperheater heat exchanger to heat domestic water pumped through the desuperheater heat exchanger at a relatively low flow rate; (b) control the reversing valve to cause refrigerant flow from the desuperheater heat exchanger to the load heat exchanger acting as a condenser and to return flow from the source heat exchanger acting as an evaporator to the compressor, wherein the refrigerant flow from the desuperheater heat exchanger comprises desuperheated refrigerant; (c) control an opening in the expansion valve to cause refrigerant flow from the load heat exchanger, through the expansion valve, and to the source heat exchanger; and (d) control the second variable speed pump to enable heat exchange in the source heat exchanger.

To operate the system in a space cooling with desuperheater water heating mode, the controller may be configured to: (a) control the first variable speed pump to enable heat exchange in the desuperheater heat exchanger to heat domestic water pumped through the desuperheater heat exchanger at a relatively low flow rate; (b) control the reversing valve to cause refrigerant flow from the desuperheater heat exchanger to the source heat exchanger acting as a condenser and to return flow from the load heat exchanger acting as an evaporator to the compressor, wherein the refrigerant flow from the desuperheater heat exchanger comprises desuperheated refrigerant; (c) control an opening in the expansion valve to cause refrigerant flow from the source heat exchanger, through the expansion valve, and to the load heat exchanger; and (d) control the second variable speed pump to enable heat exchange in the source heat exchanger.

To operate the system in a space cooling to water heating mode, the controller may be configured to: (a) control the first variable speed pump to enable heat exchange in the desuperheater heat exchanger to heat domestic water pumped through the desuperheater heat exchanger at a relatively high flow rate; (b) control the reversing valve to cause refrigerant flow from the desuperheater heat exchanger acting as a condenser to the source heat exchanger configured in an inactive state and to return flow from the load heat exchanger acting as an evaporator to the compressor; (c) control an opening in the expansion valve to cause refrigerant flow from the source heat exchanger, through the expansion valve, and to the load heat exchanger; and (d) control the second variable speed pump to disable heat exchange in the source heat exchanger. In this mode, the load heat exchanger may be a refrigerant-to-air heat exchanger, and the controller may be configured to control a variable speed motor to drive a fan to flow air over a portion of the load heat exchanger.

To operate the system in a water heating mode, the controller may be configured to: (a) control the first variable speed pump to enable heat exchange in the desuperheater heat exchanger to heat domestic water pumped through the desuperheater heat exchanger at a relatively high flow rate; (b) control the reversing valve to cause refrigerant flow from the desuperheater heat exchanger acting as a condenser to the load heat exchanger configured in an inactive state and to return flow from the source heat exchanger acting as an evaporator to the compressor; (c) control an opening in the expansion valve to cause refrigerant flow from the load heat exchanger, through the expansion valve, and to the source heat exchanger; and (d) control the second variable speed pump to enable heat exchange in the source heat exchanger.

In another embodiment, a heat pump system is disclosed, comprising a refrigerant circuit that fluidly interconnects: (1) a variable speed compressor; (2) a desuperheater heat exchanger positioned downstream of the compressor and operable as a desuperheater, a condenser, or an evaporator; (3) a source heat exchanger operable as either a condenser or an evaporator; (4) a load heat exchanger operable as either a condenser or an evaporator; (5) a reversing valve positioned downstream of the desuperheater heat exchanger and configured to alternately direct refrigerant flow from the desuperheater heat exchanger to one of the load heat exchanger and the source heat exchanger and to alternately return refrigerant flow from the other of the load heat exchanger and the source heat exchanger to the compressor; and (6) an expansion valve positioned between the load heat exchanger and the source heat exchanger. The heat pump system is operable in any of at least: (a) a space heating mode in which the desuperheater heat exchanger is configured in an inactive state, (b) a space cooling mode in which the desuperheater heat exchanger is configured in an inactive state, (c) a space heating with concurrent desuperheater water heating mode in which refrigerant flow from the desuperheater heat exchanger comprises desuperheated refrigerant, (d) a space cooling with concurrent desuperheater water heating mode in which refrigerant flow from the desuperheater heat exchanger comprises desuperheated refrigerant, (e) a space cooling to water heating mode in which refrigerant flow from the desuperheater heat exchanger comprises condensed refrigerant, the load heat exchanger is configured in an active state, and the source heat exchanger is configured in an inactive state, and (f) a dedicated water heating mode in which refrigerant flow from the desuperheater heat exchanger comprises condensed refrigerant, the load heat exchanger is configured in an inactive state and the source heat exchanger is configured in an active state.

In another embodiment, a method for operating a heat pump system is disclosed, comprising: (1) providing a refrigerant circuit that fluidly interconnects: (a) a variable speed compressor, (b) a desuperheater heat exchanger positioned downstream of the compressor and operable as a desuperheater, a condenser, or an evaporator, (c) a source heat exchanger operable as either a condenser or an evaporator, (d) a load heat exchanger operable as either a condenser or an evaporator, (e) a reversing valve positioned downstream of the desuperheater heat exchanger and configured to alternately direct refrigerant flow from the desuperheater heat exchanger to one of the load heat exchanger and the source heat exchanger and to alternately return refrigerant flow from the other of the load heat exchanger and the source heat exchanger to the compressor, and (f) an expansion valve positioned between the load heat exchanger and the source heat exchanger; (2) providing a controller comprising a processor and memory on which one or more software programs are stored; and (3) operating the controller to control operation of the reversing valve, the expansion valve, the compressor, a first variable speed pump for circulating domestic water through the desuperheater heat exchanger, and a second variable speed pump for circulating a liquid through the source heat exchanger.

To operate the heat pump system in a space heating mode may include: (i) controlling the first variable speed pump to disable heat exchange in the desuperheater heat exchanger; (ii) controlling the reversing valve to cause refrigerant flow from the desuperheater heat exchanger to the load heat exchanger acting as a condenser and to return flow from the source heat exchanger acting as an evaporator to the compressor; (iii) controlling an opening in the expansion valve to cause refrigerant flow from the load heat exchanger, through the expansion valve, and to the source heat exchanger; and (iv) controlling the second variable speed pump to enable heat exchange in the source heat exchanger.

To operate the heat pump system in a space cooling mode may include: (i) controlling the first variable speed pump to disable heat exchange in the desuperheater heat exchanger; (ii) controlling the reversing valve to cause refrigerant flow from the desuperheater heat exchanger to the source heat exchanger acting as a condenser and to return flow from the load heat exchanger acting as an evaporator to the compressor; (iii) controlling an opening in the expansion valve to cause refrigerant flow from the source heat exchanger, through the expansion valve, and to the load heat exchanger; and (iv) controlling the second variable speed pump to enable heat exchange in the source heat exchanger.

To operate the heat pump system in a space heating with desuperheater water heating mode may include: (i) controlling the first variable speed pump to enable heat exchange in the desuperheater heat exchanger to heat domestic water pumped through the desuperheater heat exchanger at a relatively low flow rate; (ii) controlling the reversing valve to cause refrigerant flow from the desuperheater heat exchanger to the load heat exchanger acting as a condenser and to return flow from the source heat exchanger acting as an evaporator to the compressor, wherein the refrigerant flow from the desuperheater heat exchanger comprises desuperheated refrigerant; (iii) controlling an opening in the expansion valve to cause refrigerant flow from the load heat exchanger, through the expansion valve, and to the source heat exchanger; and (iv) controlling the second variable speed pump to enable heat exchange in the source heat exchanger.

To operate the heat pump system in a space cooling with desuperheater water heating mode may include: (i) controlling the first variable speed pump to enable heat exchange in the desuperheater heat exchanger to heat domestic water pumped through the desuperheater heat exchanger at a relatively low flow rate; (ii) controlling the reversing valve to cause refrigerant flow from the desuperheater heat exchanger to the source heat exchanger acting as a condenser and to return flow from the load heat exchanger acting as an evaporator to the compressor, wherein the refrigerant flow from the desuperheater heat exchanger comprises desuperheated refrigerant; (iii) controlling an opening in the expansion valve to cause refrigerant flow from the source heat exchanger, through the expansion valve, and to the load heat exchanger; and (iv) controlling the second variable speed pump to enable heat exchange in the source heat exchanger.

To operate the heat pump system in a space cooling to water heating mode may include: (i) controlling the first variable speed pump to enable heat exchange in the desuperheater heat exchanger to heat domestic water pumped through the desuperheater heat exchanger at a relatively high flow rate; (ii) controlling the reversing valve to cause refrigerant flow from the desuperheater heat exchanger acting as a condenser to the source heat exchanger configured in an inactive state and to return flow from the load heat exchanger acting as an evaporator to the compressor; (iii) controlling an opening in the expansion valve to cause refrigerant flow from the source heat exchanger, through the expansion valve, and to the load heat exchanger; and (iv) controlling the second variable speed pump to disable heat exchange in the source heat exchanger. In this mode, the heat pump system may be configured to include controlling a variable speed motor to drive a fan to flow air over a portion of the load heat exchanger.

To operate the heat pump system in a water heating mode may include: (i) controlling the first variable speed pump to enable heat exchange in the desuperheater heat exchanger to heat domestic water pumped through the desuperheater heat exchanger at a relatively high flow rate; (ii) controlling the reversing valve to cause refrigerant flow from the desuperheater heat exchanger acting as a condenser to the load heat exchanger configured in an inactive state and to return flow from the source heat exchanger acting as an evaporator to the compressor; (iii) controlling an opening in the expansion valve to cause refrigerant flow from the load heat exchanger, through the expansion valve, and to the source heat exchanger; and (iv) controlling the second variable speed pump to enable heat exchange in the source heat exchanger.

BRIEF DESCRIPTION OF THE DRAWINGS

For a better understanding of the features described in this disclosure, reference may be made to embodiments shown in the drawings. The components in the drawings are not necessarily to scale, and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION

Figure 1:
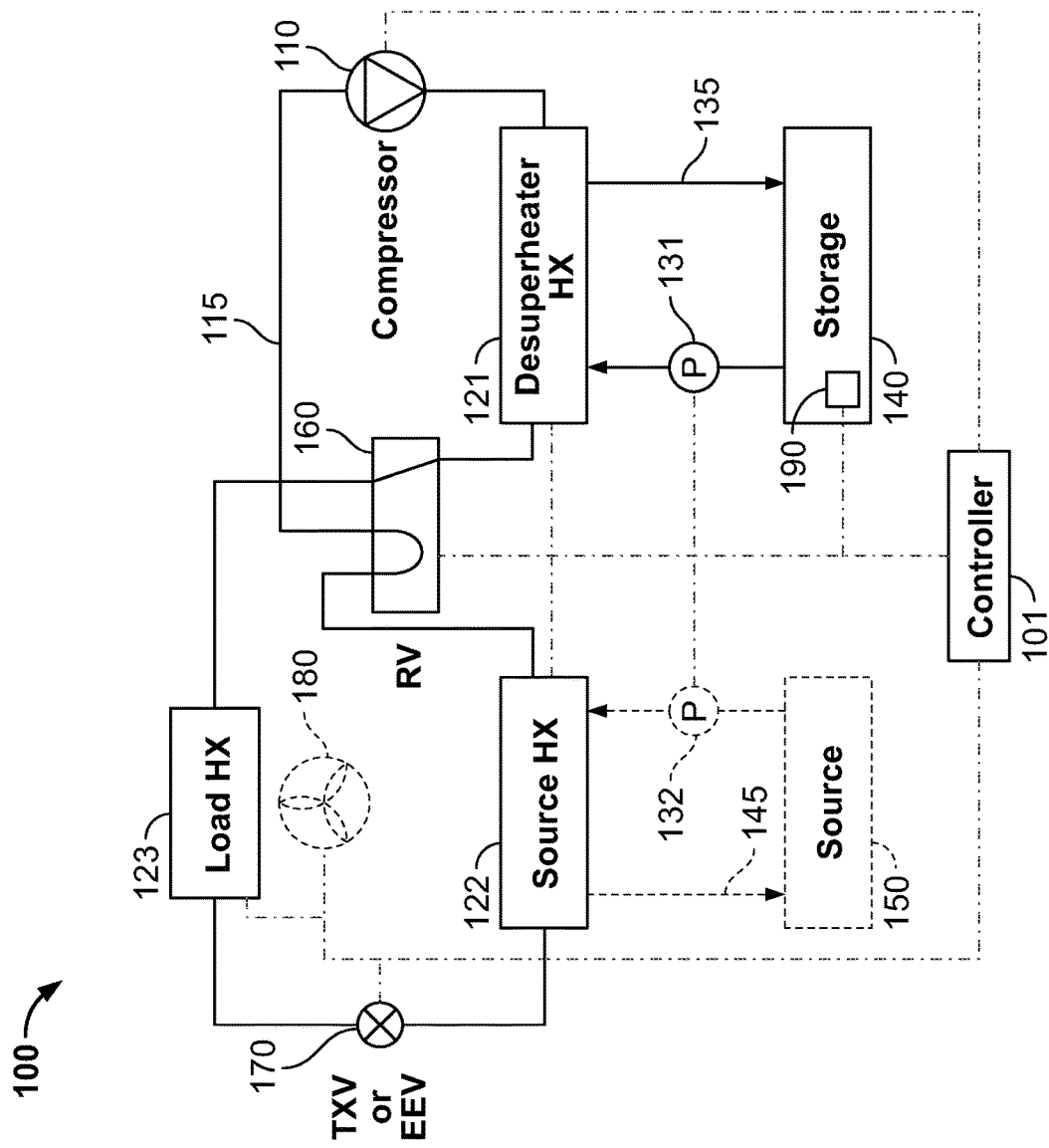
FIG. 1 is a schematic of a heat pump system according to the instant disclosure.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

A heat pump system including a desuperheater is disclosed for providing the heating, cooling, and water heating needs for a structure. The heat pump system described herein includes embodiments designed to minimize the number of components. For example, the heat pump system disclosed herein utilizes a single expansion valve in place of a combination of expansion valves, check valves, and/or receiver to increase the efficiency of the system. In some embodiments, the system may include one or more fans, blowers, or air handlers for circulating heated or cooled air produced by the heat pump system throughout the structure. In some embodiments, the system may include auxiliary heater(s) for satisfying any additional heating needs. For example, an auxiliary heater may be included in a storage tank or connected to storage tank plumbing and configured to provide auxiliary heating to water stored in the storage tank according to some embodiments.

The heat pump system of the instant disclosure provides at least six modes of operation: (1) space heating, (2) space cooling, (3) space heating with desuperheater water heating, (4) space cooling with desuperheater water heating, (5) space cooling to water heating, and (6) dedicated water heating. The heat pump system of the instant disclosure eliminates the need to isolate the third, unused heat exchanger in any given mode of operation, which eliminates the possibility of refrigerant accumulating in the unused, third heat exchanger. The refrigerant in the heat pump system of the instant disclosure may include any known refrigerant, such as R410A or R32, or any later-developed type of refrigerant.

Use of a variable speed compressor as disclosed herein allows appropriate capacity for domestic water heating and space conditioning. For example, although demand may call for the heat pump system to require a 1-ton compressor, the heat pump of the instant disclosure allows the use of a 4-5 ton compressor, for example, that is driven at a low speed to match the demand. Conversely, if demand requires a 4-5 ton compressor, for example, then the heat pump system will have the capacity to meet that demand.

Use of one or more variable speed fan motors as disclosed herein allows appropriate airflow for capacity modulation. Use of one or more variable speed pumps as disclosed herein allows more appropriate water/fluid flow for capacity modulation. In addition, by varying the rate of water flowing through a desuperheater heat exchanger, the heat pump system can control whether the unit desuperheats or fully condenses the refrigerant. The desuperheater heat exchanger may be sized and/or configured to fully condense the refrigerant when desired.

Turning to the drawings, FIG. 1 illustrates an embodiment of a heat pump system 100 of the instant disclosure. In this embodiment, heat pump system 100 includes variable speed compressor 110, desuperheater heat exchanger 121 for heating domestic water, reversing valve 160, source heat exchanger 122, expansion valve 170 comprising either a mechanical thermostatic expansion valve (TXV) or an electronically controlled thermostatic expansion valve (EEV), and load heat exchanger 123 for heating or cooling a space. Each of these components are fluidly connected to one another by vapor compression refrigerant circuit 115 comprising one or more fluid conduits through which refrigerant is conveyed to/from these components according to the processes described herein.

Heat pump system 100 may also include controller 101, which may be functionally connected to one or more of the foregoing components (as well as other components not shown) to control the operation, position, or function of one or more features of one or more of these components. For example, controller 101 may control the direction of flow and the flowrate of refrigerant in refrigerant circuit 115 according to an operational mode of heat pump system 100 as well as the heating and cooling demand on heat pump system 100.

In some embodiments, desuperheater, source, and load heat exchangers 121,122,123 may each be configured as refrigerant-to-liquid heat exchangers. In other embodiments, only desuperheater and source heat exchangers 121,122 are configured as refrigerant-to-liquid heat exchangers. In still other embodiments, only desuperheater heat exchanger 121 is configured as a refrigerant-to-liquid heat exchanger. In such embodiments, these heat exchangers may be configured as coaxial heat exchangers, brazed plate heat exchangers, or any type of heat exchanger capable of exchanging heat between two adjacent fluids.

In some embodiments, source heat exchanger 122 and/or load heat exchanger 123 may be configured as a refrigerant-to-air heat exchanger. If source heat exchanger 122 and/or load heat exchanger 123 is a refrigerant-to-air heat exchanger, heat pump system 100 may also include one or more fans or blowers 180 powered by respective variable speed fan motors to convey air across the coils of the respective source and/or load heat exchangers 122,123 to exchange heat with the refrigerant in the refrigerant circuit, which air may thereafter be circulated throughout a space or structure to provide for heating and/or cooling needs. If load heat exchanger 123, for example, is a refrigerant-to-liquid heat exchanger, then heat pump system 100 may be configured to include a load loop (not shown) configured to circulate a liquid therein to exchange heat with the refrigerant in the load heat exchanger 123. The load loop may include a variable speed pump for circulating a liquid through the load loop.

As shown in the embodiment of FIG. 1, heat pump system 100 includes storage loop 135 connecting desuperheater heat exchanger 121 to storage tank 140, and source loop 145 connecting source heat exchanger 122 to source 150 if source heat exchanger 122 is a refrigerant-to-liquid heat exchanger. Source 150 may be configured to act as a heat sink or heat source and may include any type of source suitable for use with a heat pump system. In some embodiments, source 150 is a geothermal source, such as a body of water or the Earth.

Storage loop 135 and source loop 145 may each comprise one or more fluid conduits configured to convey a fluid, such as water, therethrough for exchanging heat with the refrigerant flowing through refrigerant circuit 115 via desuperheater heat exchanger 121 and source heat exchanger 122, respectively. For example, in various embodiments, desuperheater heat exchanger 121, when activated, is configured to exchange heat between the refrigerant circulating in refrigerant circuit 115 and water circulating in storage loop 135 to create hot water that may be stored in storage tank 140. Similarly, in various embodiments, source heat exchanger 122, when activated, is configured to exchange heat between the refrigerant circulating in refrigerant circuit 115 and water or other liquid circulating in source loop 145. In embodiments in which source heat exchanger 122 is a refrigerant-to-air heat exchanger, then source loop 145 may be omitted and replaced with a fan 180 driven by a variable speed motor. In some embodiments, the fluid circulating through source loop 145 may be an antifreeze. The flow rate of water circulating through storage loop 135 may be controlled by controller 101 by controlling variable speed pump 131. Similarly, the flow rate of water, antifreeze or other liquid circulating through source loop 145 may be controlled by controller 101 by controlling variable speed pump 132.

Storage tank 140 may further include one or more temperature sensors 190 for detecting the temperature of water stored in storage tank 140. Although FIG. 1 illustrates the one or more temperature sensors 190 being included as part of the storage tank 140, the one or more temperature sensors 190 may alternatively be located at any other location along storage loop 135 to detect the temperature of water circulating through storage loop 135. In addition, to enable the controller 101 to precisely monitor and adjust performance of heat pump system 100, one or more temperature sensors 190, one or more pressure sensors 191, one or more flow rate sensors 192, one or more voltage sensors, and one or more current sensors may be positioned anywhere on heat pump system 100, including along refrigerant circuit 115, along source loop 145, along the load loop (if present), along storage loop 135, near the inlet and/or discharge ports of the desuperheater, source, and load heat exchangers, 121,122, 123, on or near the suction end and discharge end of compressor 110, upstream, downstream and/or on expansion valve 170, and on or near any motor and pump.

Some or all of the components of heat pump system 100 may be installed within the structure in which air conditioning, heating, or hot water is desired. In some embodiments, some components, such as one or more portions of source loop 145, may be installed outdoors.

Various operating modes of heat pump system 100 are shown in FIGS. 2 through 7, where source heat exchanger 122 is shown for illustration purposes as being a refrigerant-to-liquid heat exchanger. As described herein, however, source heat exchanger 122 may alternatively be configured as a refrigerant-to-air heat exchanger with a fan 180 positioned in proximity thereto to flow air over source heat exchanger 122 to exchange heat with the refrigerant circulating through refrigerant circuit 115.

At least one of the operating modes may be initiated automatically by controller 101 when the temperature of the water stored in storage tank 140 falls below a predetermined value. At least some of the various operating modes may be initiated automatically by controller 101 in response to a call for heating or cooling, for example, by one or more thermostats 195 according to predetermined user settings, or in response to a call for heating or cooling requested by a user operating the thermostat or by a user selectable input at a user interface that enables a user to select an operational mode of heat pump system 100. The one or more thermostats 195 may be any known or later developed device for detecting a temperature in a space and for triggering a call for heating or cooling of the space. For example, in one embodiment, the thermostat may be a mechanical, mercury-style thermostat. In another embodiment, the thermostat may be an electric, thermistor-style thermostat. The one or more thermostats 195 may be electronically programmable by a user via a user interface. The user interface may be a touch screen, which may be detachable from the thermostat. The user interface may be associated with a user's web-enabled device, including a mobile phone, a tablet, a smart watch, and a personal computer, operating a web application that remotely interfaces with the one or more thermostats 195 and/or controller 101. In this way, a user may remotely access, program, and/or control the thermostat and/or controller 101. The one or more thermostats 195 may include a smart thermostat that is connected to the Internet and capable of learning user behaviors and patterns for automatically adjusting operational settings of the thermostat or controller 101. The one or more thermostats 195 may be connected to controller 101 by wire, or may alternatively be wirelessly connected to controller 101 via W-Fi, Bluetooth, or any other wireless protocol.

Figure 2:
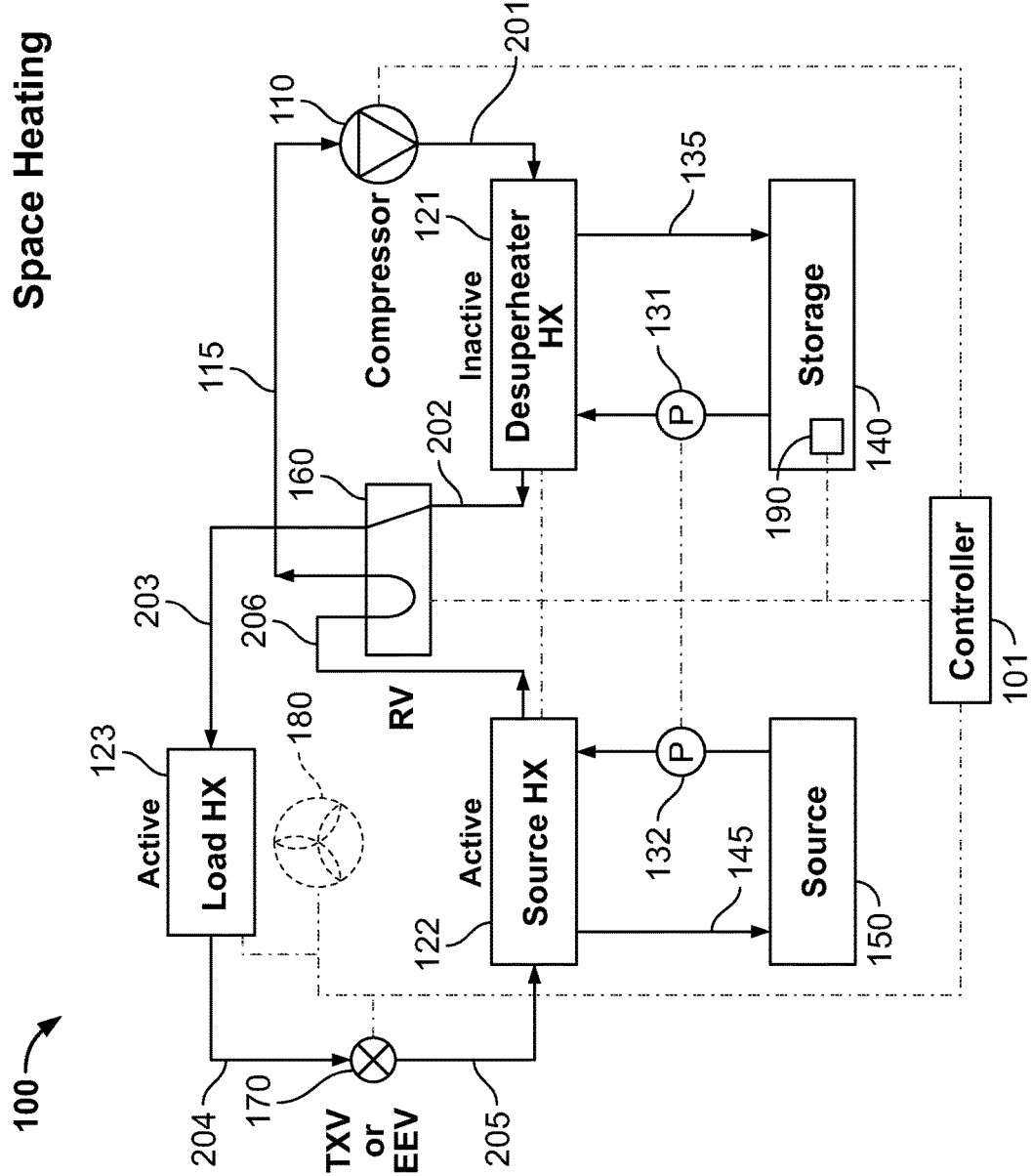
FIG. 2 is a schematic illustrating a first operational mode of the heat pump system illustrated in FIG. 1.

FIG. 2 illustrates heat pump system 100 configured in a space heating mode for heating air in a space or a structure, such as a home or office. In this mode, desuperheater heat exchanger 121 is inactive, and load heat exchanger 123 and source heat exchanger 122 are both active.

At 201, hot, compressed refrigerant gas leaving compressor 110 is conveyed through inactive desuperheater heat exchanger 121 (i.e., storage loop 135 is inactive). At 202, the hot, compressed refrigerant gas is conveyed to reversing valve 160 (reversing valve 160 is powered off), where the refrigerant is then conveyed to load heat exchanger 123.

At 203, the hot, compressed refrigerant gas enters load heat exchanger 123 acting as a condenser to cause the refrigerant to condense to a liquid. If load heat exchanger 123 is a refrigerant-to-liquid heat exchanger, such as a coaxial heat exchanger, then the compressed refrigerant gas may exchange heat with relatively cooler liquid flowing through a load loop (not shown). If load heat exchanger 123 is an air coil heat exchanger, air flowing over the coils of load heat exchanger 123 may cool the compressed refrigerant gas flowing in the coils. As the heated refrigerant gas is cooled, heat is concurrently released from the refrigerant and absorbed by the air as it passes over the coils of load heat exchanger 123, and the heated air may then be utilized to heat a space within the structure.

At 204, liquid refrigerant (at relatively high pressure) exits load heat exchanger 123 and is conveyed to expansion valve 170. Expansion valve 170 separates high and low pressure refrigerant and meters the refrigerant as a liquid for entry to the source heat exchanger 122.

At 205, the metered liquid refrigerant is conveyed to source heat exchanger 122 acting as an evaporator to vaporize the refrigerant by exchanging heat with the relatively warmer source liquid from source loop 145.

At 206, refrigerant gas is conveyed to reversing valve 160 (powered off), which diverts the refrigerant gas back to compressor 110 to continue the cycle.

Figure 3:
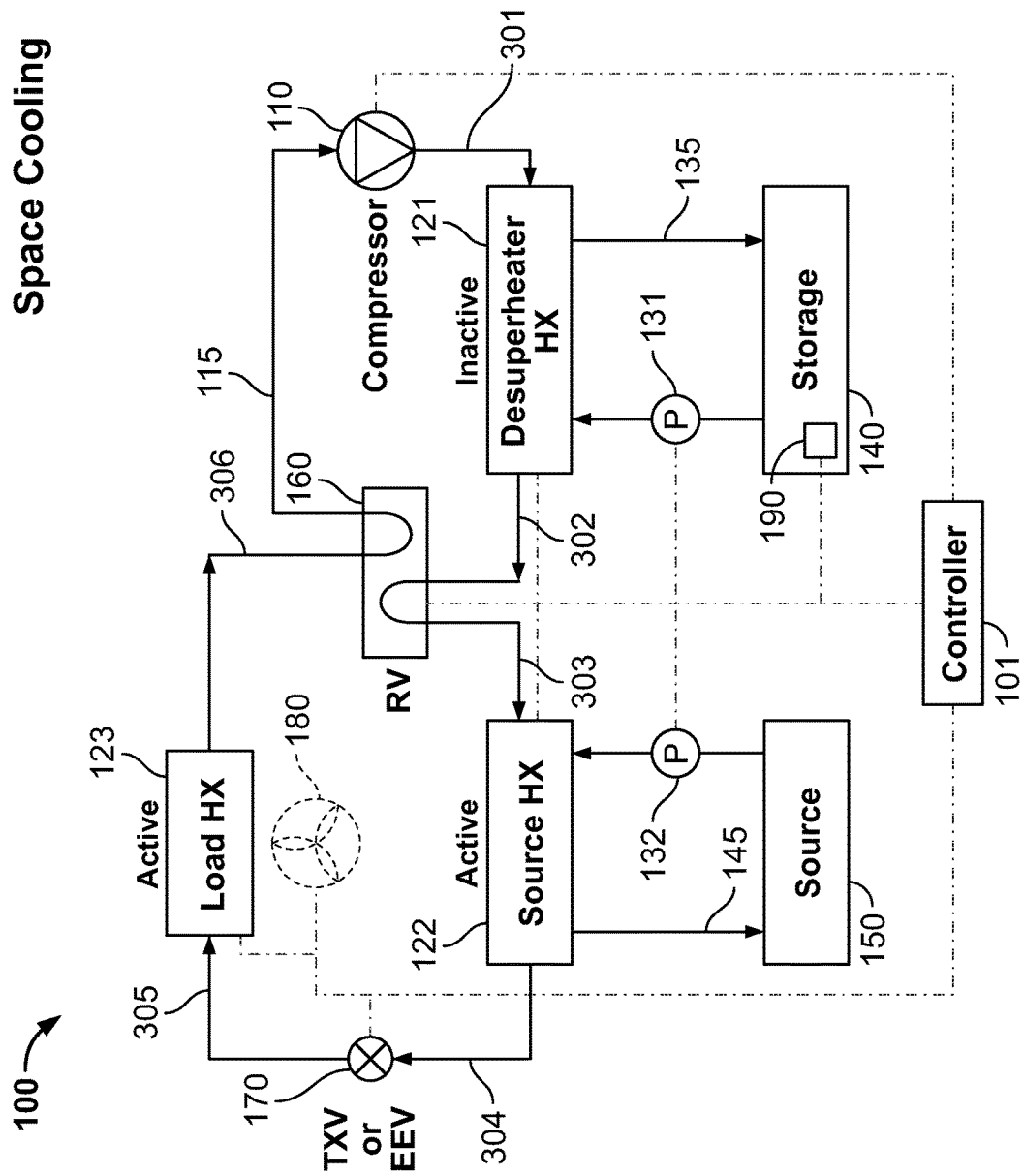
FIG. 3 is a schematic illustrating a second operational mode of the heat pump system illustrated in FIG. 1.

FIG. 3 illustrates heat pump system 100 configured in a space cooling mode for cooling air in a space or a structure, such as a home or office. In this mode, desuperheater heat exchanger 121 is inactive, and load heat exchanger 123 and source heat exchanger 122 are both active.

At 301, hot, compressed refrigerant gas leaving compressor 110 is conveyed through inactive desuperheater heat exchanger 121 (i.e., storage loop 135 is inactive). At 302, the hot, compressed refrigerant gas is conveyed to reversing valve 160 (reversing valve 160 is powered on), where the refrigerant is then conveyed to source heat exchanger 122.

At 303, the hot, compressed refrigerant gas enters source heat exchanger 122 acting as a condenser to cause the refrigerant to condense to a liquid by exchanging heat with the relatively cooler source liquid from source loop 145.

At 304, liquid refrigerant (at relatively high pressure) exits source heat exchanger 122 and is conveyed to expansion valve 170. Expansion valve 170 separates high and low pressure refrigerant and meters the refrigerant as a liquid for entry to the load heat exchanger 123.

At 305, the metered liquid refrigerant is conveyed to load heat exchanger 123 acting as an evaporator to vaporize the refrigerant by exchanging heat with the relatively warmer load liquid from load loop (not shown) or by the relatively warmer air being blown over the coils of load heat exchanger 123 if load heat exchanger 123 is an air coil heat exchanger. In the latter case, for example, as the liquid refrigerant absorbs heat from the air flowing over the coils of load heat exchanger 123, the air flowing over the coils of load heat exchanger 123 by fan 180 becomes cooled and the refrigerant changes phase to become a vapor. The structure may then be cooled as fan 180 blows the cooled air through a duct system that distributes the cooled air to one or more spaces within the structure to be cooled.

At 306, refrigerant gas is conveyed to reversing valve 160 (powered on), which diverts the refrigerant gas back to compressor 110 to continue the cycle.

Figure 4:
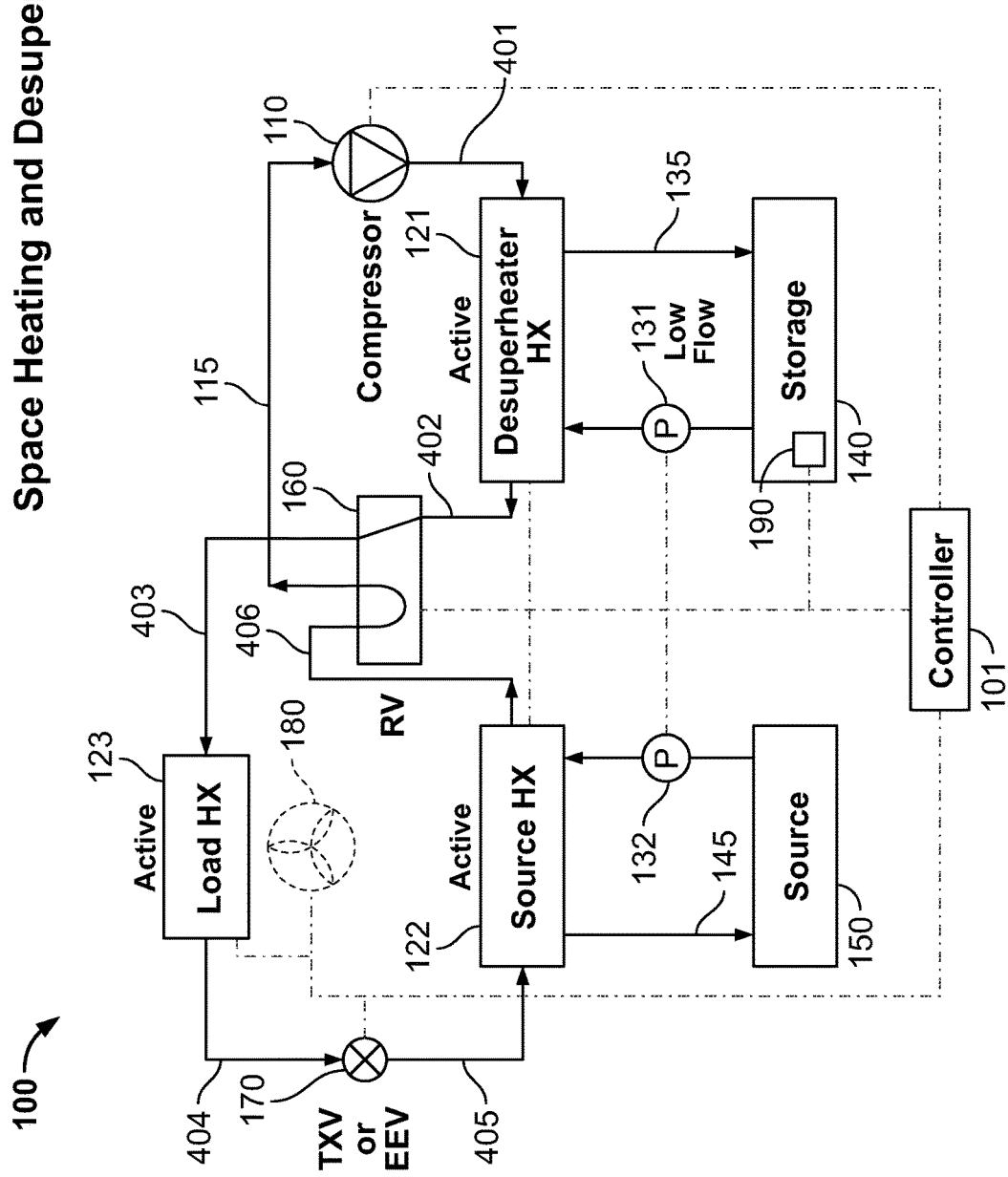
FIG. 4 is a schematic illustrating a third operational mode of the heat pump system illustrated in FIG. 1.

FIG. 4 illustrates heat pump system 100 configured in a space heating with desuperheater water heating mode for (1) heating air in a space or a structure, such as a home or office, and for (2) desuperheater domestic water heating. In this mode, desuperheater heat exchanger 121, load heat exchanger 123, and source heat exchanger 122 are all active, and domestic water heating occurs concurrently with space heating.

At 401, hot, compressed refrigerant gas leaving compressor 110 is conveyed through active desuperheater heat exchanger 121 where relatively low water flow is allowed to flow through storage loop 135 by controlling the speed of pump 131. The refrigerant is desuperheated by exchanging heat with the relatively cooler water flowing at a relatively low rate through the storage loop 135.

At 402, the desuperheated refrigerant gas is conveyed to reversing valve 160 (reversing valve 160 is powered off), where the refrigerant is then conveyed to load heat exchanger 123.

At 403, the desuperheated refrigerant gas enters load heat exchanger 123 acting as a condenser to cause the refrigerant to condense to a liquid. If load heat exchanger 123 is a refrigerant-to-liquid heat exchanger, such as a coaxial heat exchanger, then the refrigerant gas may exchange heat with relatively cooler liquid flowing through load loop (not shown). If load heat exchanger 123 is an air coil heat exchanger, air flowing over the coils of load heat exchanger 123 may cool the desuperheated refrigerant gas flowing in the coils. As the desuperheated refrigerant gas is cooled, heat is concurrently released from the refrigerant and absorbed by the air as it passes over the coils of load heat exchanger 123, and the heated air may then be utilized to heat a space within the structure.

At 404, liquid refrigerant (at relatively high pressure) exits load heat exchanger 123 and is conveyed to expansion valve 170. Expansion valve 170 separates high and low pressure refrigerant and meters the refrigerant as a liquid for entry to the source heat exchanger 122.

At 405, the metered liquid refrigerant is conveyed to source heat exchanger 122 acting as an evaporator to vaporize the refrigerant by exchanging heat with the relatively warmer source liquid from source loop 145.

At 406, refrigerant gas is conveyed to reversing valve 160 (powered off), which diverts the refrigerant gas back to compressor 110 to continue the cycle.

Figure 5:
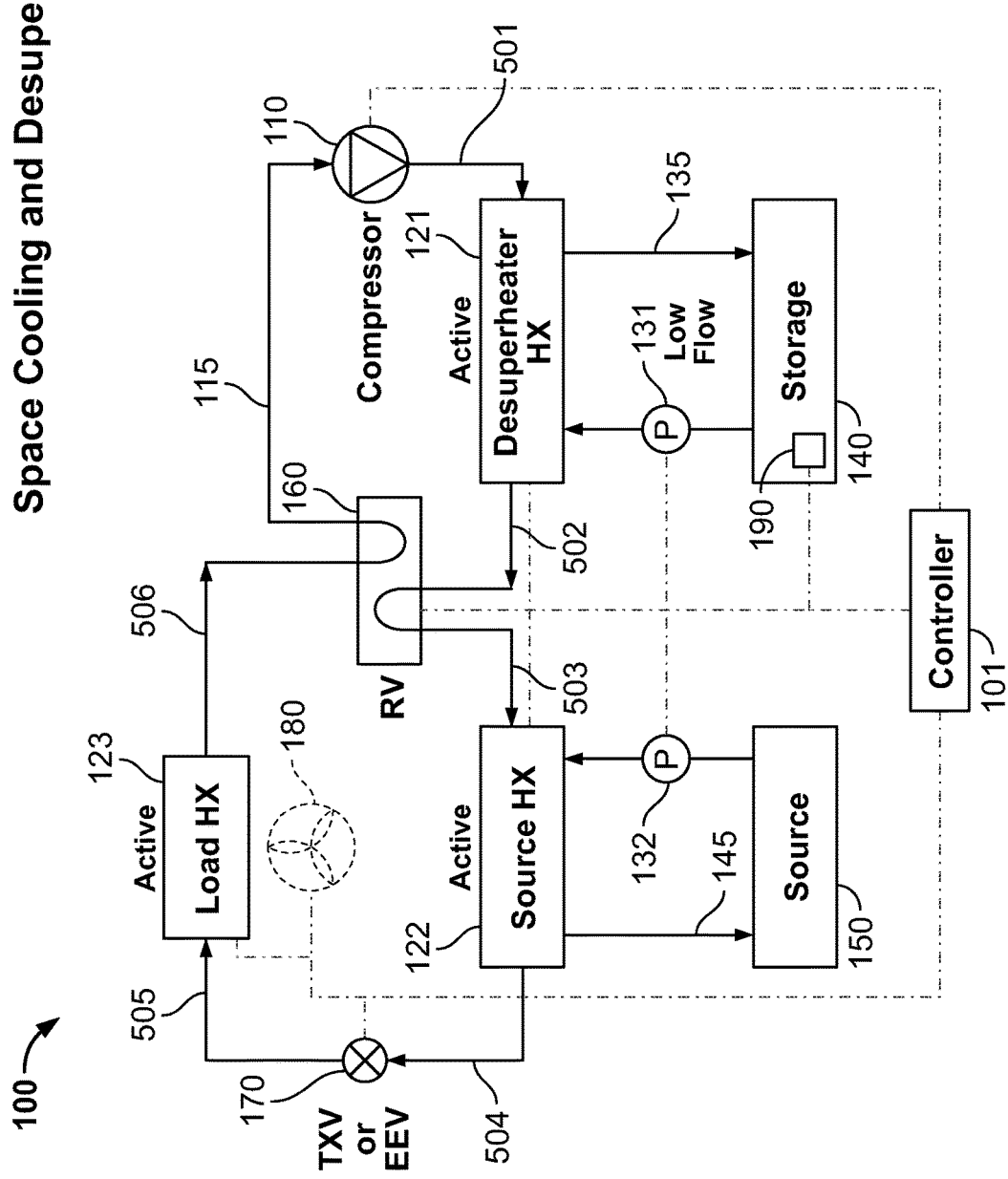
FIG. 5 is a schematic illustrating a fourth operational mode of the heat pump system illustrated in FIG. 1.

FIG. 5 illustrates heat pump system 100 configured in a space cooling with desuperheater water heating mode for (1) cooling air in a space or a structure, such as a home or office, and for (2) desuperheater domestic water heating. In this mode, desuperheater heat exchanger 121, load heat exchanger 123, and source heat exchanger 122 are all active, and domestic waterer heating occurs concurrently with space cooling.

At 501, hot, compressed refrigerant gas leaving compressor 110 is conveyed through active desuperheater heat exchanger where relatively low water flow is allowed to flow through storage loop 135 by controlling the speed of pump 131. The refrigerant is desuperheated by exchanging heat with the relatively cooler water flowing at a relatively low rate through the storage loop 135.

At 502, the desuperheated refrigerant gas is conveyed to reversing valve 160 (reversing valve 160 is powered on), where the refrigerant is then conveyed to source heat exchanger 122.

At 503, the desuperheated refrigerant gas enters source heat exchanger 122 acting as a condenser to cause the refrigerant to condense to a liquid by exchanging heat with the relatively cooler source liquid from source loop 145.

At 504, liquid refrigerant (at relatively high pressure) exits source heat exchanger 122 and is conveyed to expansion valve 170. Expansion valve 170 separates high and low pressure refrigerant and meters the refrigerant as a liquid for entry to the load heat exchanger 123.

At 505, the metered liquid refrigerant is conveyed to load heat exchanger 123 acting as an evaporator to vaporize the refrigerant by exchanging heat with the relatively warmer load liquid from load loop (not shown) or by the relatively warmer air being blown over the coils of load heat exchanger 123 if load heat exchanger 123 is an air coil heat exchanger. In the latter case, for example, as the liquid refrigerant absorbs heat from the air flowing over the coils of load heat exchanger 123, the air flowing over the coils of load heat exchanger 123 by fan 180 becomes cooled and the refrigerant changes phase to become a vapor. The structure may then be cooled as fan 180 blows the cooled air through a duct system that distributes the cooled air to one or more spaces within the structure to be cooled.

At 506, refrigerant gas is conveyed to reversing valve 160 (powered on), which diverts the refrigerant gas back to compressor 110 to continue the cycle.

Figure 6:
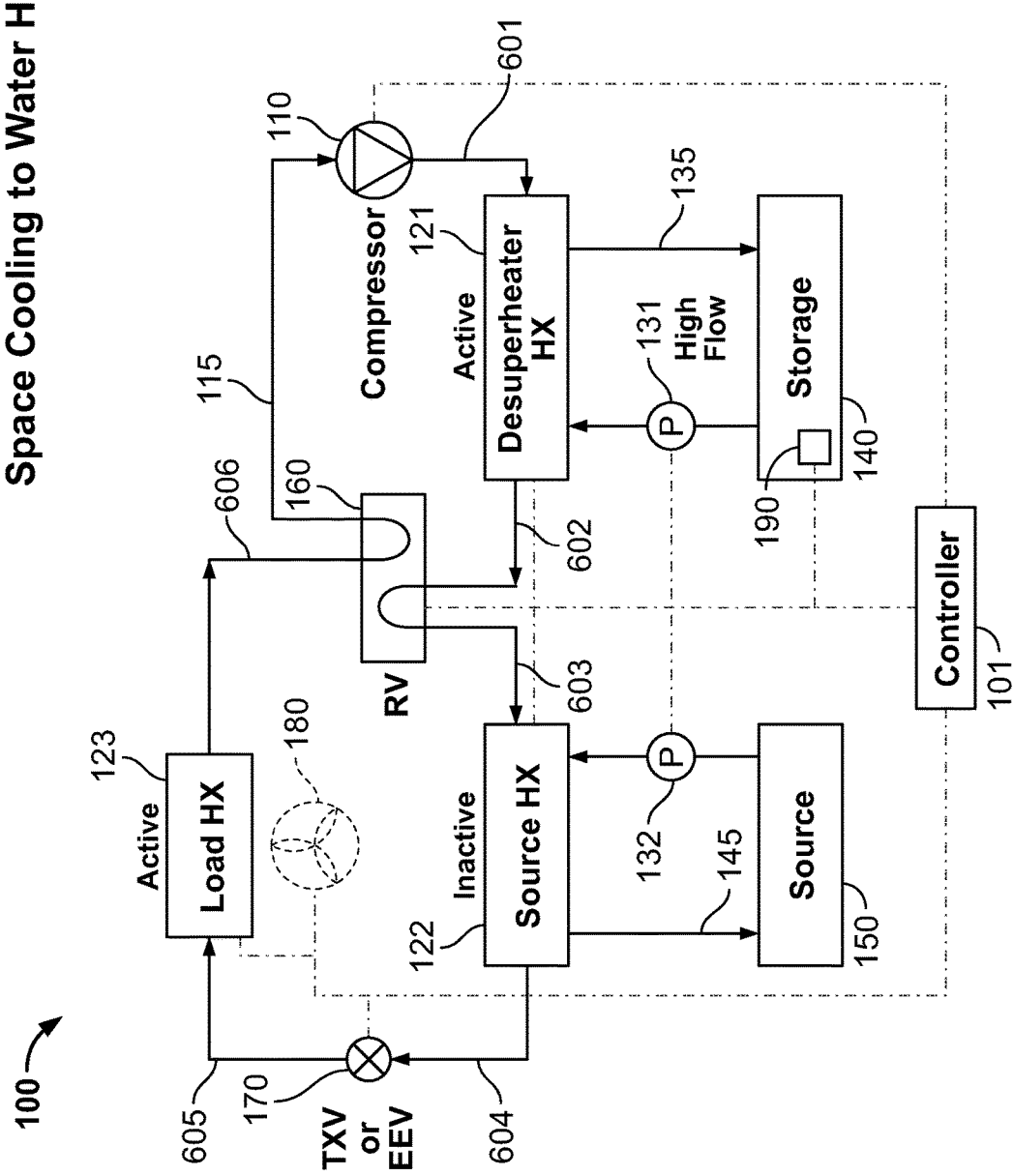
FIG. 6 is a schematic illustrating a fifth operational mode of the heat pump system illustrated in FIG. 1.

FIG. 6 illustrates heat pump system 100 configured in a space cooling to water heating mode for (1) cooling air in a space or a structure, such as a home or office, and for (2) domestic water heating. In this mode, desuperheater heat exchanger 121 and load heat exchanger 123 are active, while the source heat exchanger 122 is inactive. In addition, a substantial amount of domestic water heating occurs concurrently with space cooling.

At 601, hot, compressed refrigerant gas leaving compressor 110 is conveyed through active desuperheater heat exchanger 121 acting as a condenser, where relatively high water flow is allowed to flow through storage loop 135 by controlling the speed of pump 131. The refrigerant is condensed to a liquid by desuperheater heat exchanger 121 by exchanging heat with the relatively cooler water flowing at a relatively high rate through the storage loop 135. In turn, the water flowing through storage loop 135 may gain a substantial amount of heat when traversing through desuperheater heat exchanger 121. The heated water may be stored and/or circulated through storage tank 140.

At 602, the liquid refrigerant is conveyed to reversing valve 160 (reversing valve 160 is powered on), where the refrigerant is then conveyed to source heat exchanger 122.

At 603, the liquid refrigerant (at relatively high pressure) is conveyed through inactive source heat exchanger 122 (i.e., source loop 145 is inactive), and at 604 is conveyed to expansion valve 170. Expansion valve 170 separates high and low pressure refrigerant and meters the refrigerant as a liquid for entry to the load heat exchanger 123.

At 605, the metered liquid refrigerant is conveyed to load heat exchanger 123 acting as an evaporator to vaporize the refrigerant by exchanging heat with the relatively warmer load liquid from load loop (not shown) or by the relatively warmer air being blown over the coils of load heat exchanger 123 if load heat exchanger 123 is an air coil heat exchanger. In the latter case, for example, as the liquid refrigerant absorbs heat from the air flowing over the coils of load heat exchanger 123, the air flowing over the coils of load heat exchanger 123 by fan 180 becomes cooled and the refrigerant changes phase to become a vapor. The structure may then be cooled as fan 180 blows the cooled air through a duct system that distributes the cooled air to one or more spaces within the structure to be cooled.

At 606, refrigerant gas is conveyed to reversing valve 160 (powered on), which diverts the refrigerant gas back to compressor 110 to continue the cycle.

Figure 7:
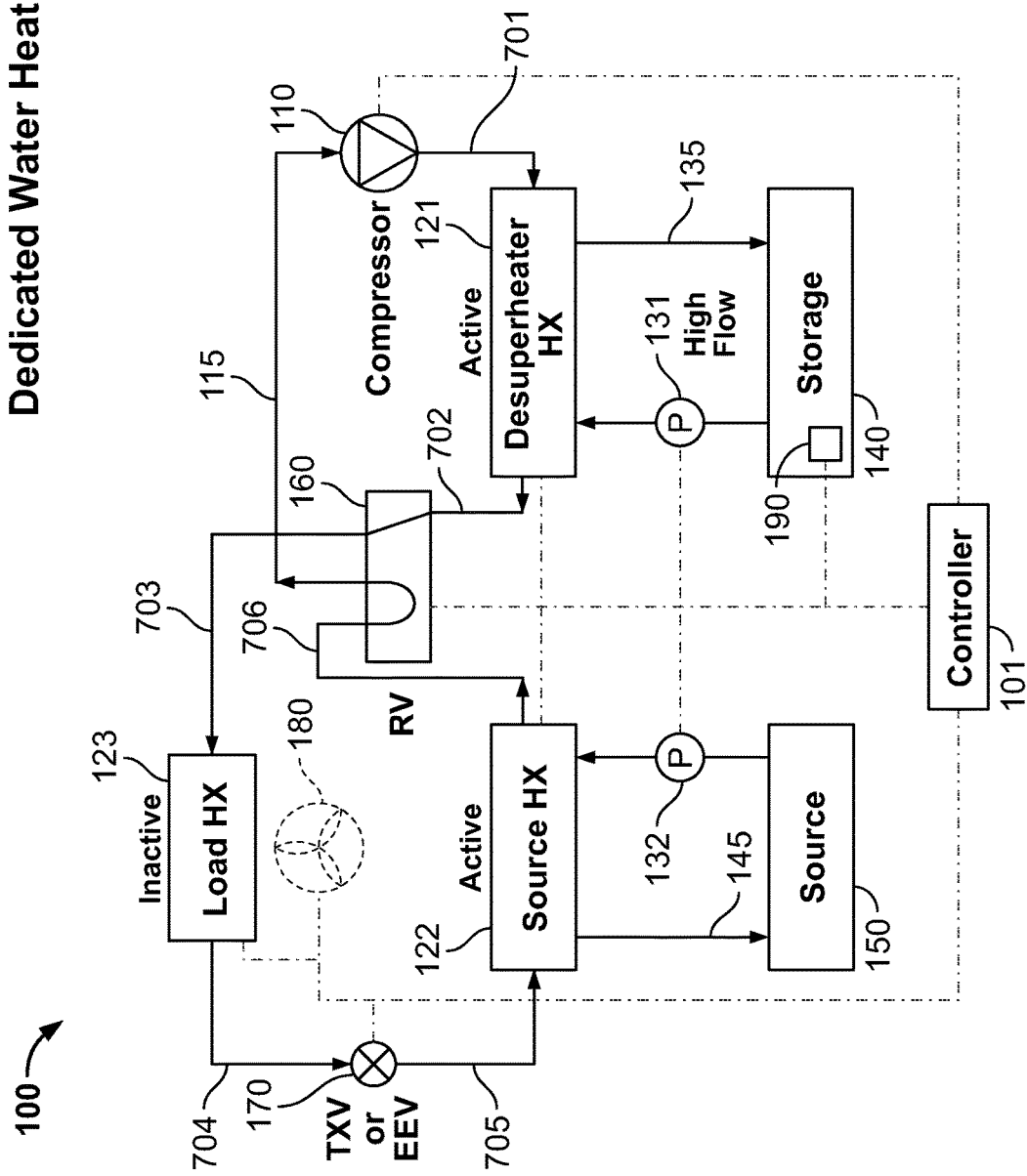
FIG. 7 is a schematic illustrating a sixth operational mode of the heat pump system illustrated in FIG. 1.

FIG. 7 illustrates heat pump system 100 configured in a dedicated water heating mode. In this mode, desuperheater heat exchanger 121 and source heat exchanger 122 are active, while the load heat exchanger 123 is inactive to provide a substantial amount of domestic water heating when space heating or cooling is not needed or when hot water demand exceeds the need for space conditioning.

At 701, hot, compressed refrigerant gas leaving compressor 110 is conveyed through active desuperheater heat exchanger 121 acting as a condenser, where relatively high water flow is allowed to flow through storage loop 135 by controlling the speed of pump 131. The refrigerant is condensed to a liquid by desuperheater heat exchanger 121 by exchanging heat with the relatively cooler water flowing at a relatively high rate through the storage loop 135. In turn, the water flowing through storage loop 135 may gain a substantial amount of heat when traversing through desuperheater heat exchanger 121. The heated water may be stored and/or circulated through storage tank 140.

At 702, the liquid refrigerant (at relatively high pressure) is conveyed to reversing valve 160 (reversing valve 160 is powered off). At 703, the liquid refrigerant is then conveyed to inactive load heat exchanger 123 (i.e., load loop (not shown) is inactive if load heat exchanger 123 is a refrigerant-to-liquid heat exchanger, and fan 180 is inactive if load heat exchanger 123 is a refrigerant-to-air heat exchanger).

At 704, liquid refrigerant (at relatively high pressure) exits load heat exchanger 123 and is conveyed to expansion valve 170. Expansion valve 170 separates high and low pressure refrigerant and meters the refrigerant as a liquid for entry to the load heat exchanger 123.

At 705, the metered liquid refrigerant is conveyed to source heat exchanger 122 acting as an evaporator to vaporize the refrigerant by exchanging heat with the relatively warmer source liquid from source loop 145.

At 706, refrigerant gas is conveyed to reversing valve 160 (powered off), which diverts the refrigerant gas back to compressor 110 to continue the cycle.

Figure 8:
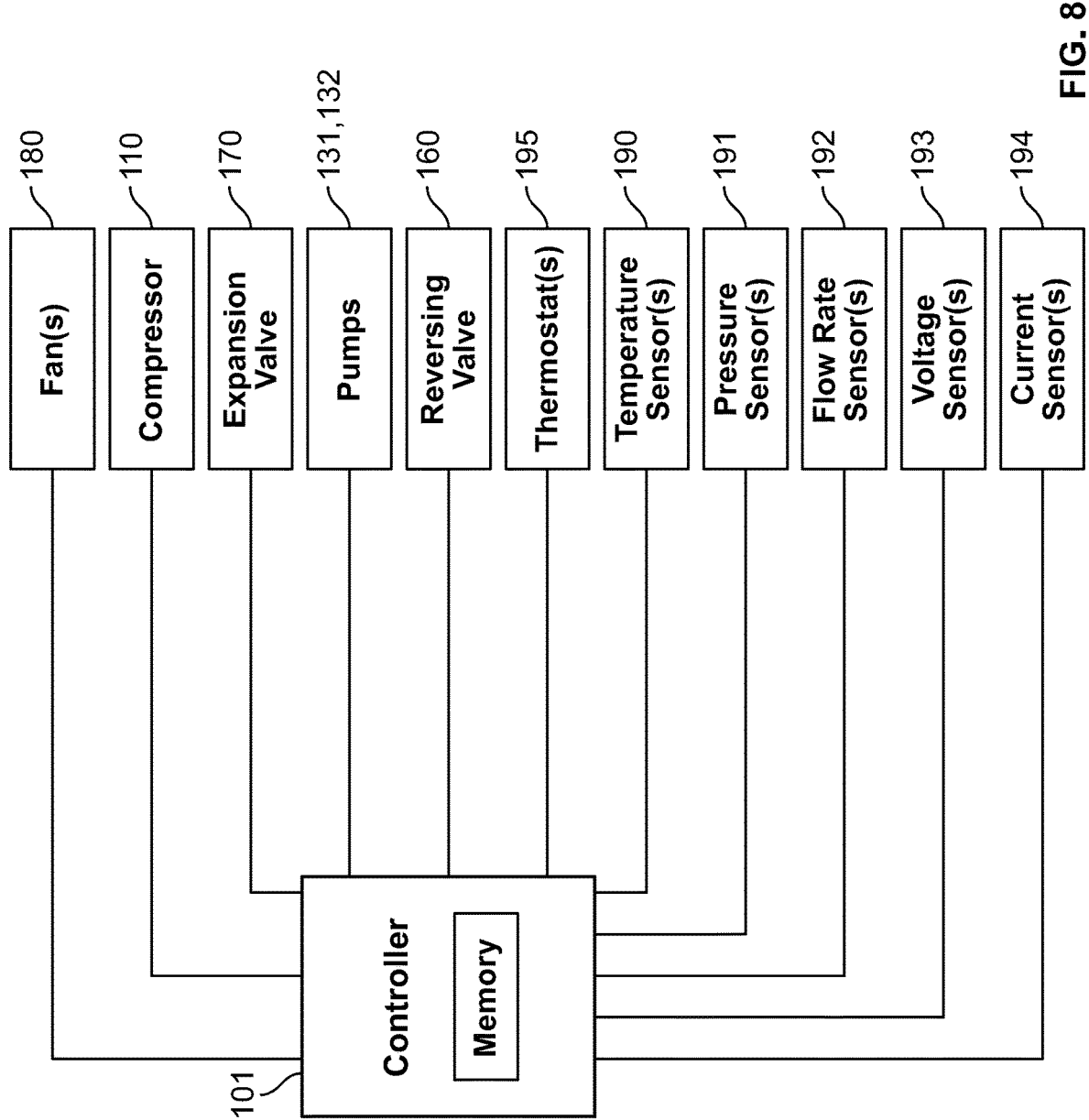
FIG. 8 is a schematic illustrating representative components of the heat pump system illustrated in FIG. 1 connected to a controller.

FIG. 8 illustrates an exemplary schematic illustrating representative components of heat pump system 100 that may be controlled by controller 101. Controller 101 may include a processor in communication with memory, wherein the memory stores a set of instructions that may be executed by the processor to cause the processor of the controller 101 to perform any one or more of the methods, processes or computer-based functions disclosed herein. For example, the controller 101 may cause one or more components of the heat pump system 100 to operate according to any one or more of the operational modes described herein.

In embodiments in which one or more fans 180 are included in the heat pump system, controller 101 may be configured to (wired or wirelessly) communicate with the one or more fans 180 (including each of the fans in a fan array) to control (1) an on/off state of the fan motor, and (2) the speed of the motor that drives the respective fan. Controlling the speed of the motor, and thus the amount of air passed over the coils of the source heat exchanger 122 and/or load heat exchanger 123 (if such heat exchangers are configured as refrigerant-to-air heat exchangers) by one or more fans 180, will control the amount of heat exchange that occurs in these heat exchangers. A variable frequency drive (VFD) may be coupled to each motor that drives the one or more fans 180. The VFD may be configured to drive the motor at any one of a number of different frequencies, including but not limited to line voltage frequency, to control the speed at which the motor operates to cause the amount of heat exchange in the source and/or load heat exchangers 122,123 to match the demand placed on heat pump system 100. In other embodiments, the motor is driven by a PWM signal according to a predetermined duty cycle to control the speed of the motor that drives the one or more fans 180.

Controller 101 may be configured to (wired or wirelessly) communicate with compressor 110 to control (1) the on/off operational state of the compressor 110, and (2) the speed at which compressor 110 operates to compress refrigerant according to the demand placed on heat pump system 100 and the operational mode of heat pump system 100. A variable frequency drive (VFD) may be coupled to compressor 110 to drive the compressor at any one of a number of different frequencies, including but not limited to line voltage frequency, to control the speed at which compressor 110 operates to match the demand placed on heat pump system 100. In other embodiments, the compressor is driven by a PWM signal according to a predetermined duty cycle to control the speed of the compressor 110.

Controller 101 may be configured to (wired or wirelessly) communicate with expansion valve 170 to precisely control the size of the orifice through which refrigerant flows in refrigerant circuit 115. Controller 101 may send and receive signals to and from a motor connected to expansion valve 170 to precisely open and close a refrigerant discharge port of expansion valve 170 and to report the position of the motor and/or valve to controller 170.

Controller 101 may be configured to (wired or wirelessly) communicate with variable speed pumps 131,132 to control the rate at which the pumps cause water and/or liquid to flow in storage loop 135 and source loop 145, respectively. Variable speed pumps 131,132 may be driven by a PWM signal according to a predetermined duty cycle to control the speed of the pumps 131,132 and therefore the discharge flow rate of these pumps.

Controller 101 may be configured to (wired or wirelessly) communicate with reversing valve 160 to control the direction of refrigerant flow in refrigerant circuit 115.

Controller 101 may be configured to (wired or wirelessly) communicate with the one or more thermostats 195 (e.g., an outdoor thermostat and/or one or more indoor thermostats for temperature controlled zones) for (1) detecting temperature differences between an outdoor temperature and an indoor temperature, and (2) for processing calls for space heating, space cooling, and/or water heating according to preprogrammed settings or manual, on-the-fly settings received from a user.

Controller 101 may be configured to (wired or wirelessly) communicate with the one or more temperature sensors 190 for detecting and processing the temperature at any one or more desired locations along refrigeration circuit 115, at any one or more desired locations along storage loop 135 including the temperature of water in the storage tank 140, at any one or more desired locations along source loop 145 including the temperature of liquid, for example, of source 150, and at any one or more desired locations along load loop (not shown).

Controller 101 may be configured to (wired or wirelessly) communicate with the one or more pressure sensors 191 for detecting and processing the static pressure at any one or more desired locations along refrigeration circuit 115.

Controller 101 may be configured to (wired or wirelessly) communicate with the one or more flow rate sensors 192 for detecting and processing the flow rate of water or other liquid along storage loop 135 and/or along source loop 145.

Controller 101 may be configured to (wired or wirelessly) communicate with the one or more voltage sensors 193 for detecting and processing the voltage across any electrical device that consumes electrical energy in heat pump system 100. For example, one or more voltage sensors may be deployed to detect the voltage provided to compressor 110, pumps 131,132, reversing valve 160, motor that drives expansion valve 170, and the one or more motors that drive the one or more fans 180.

Controller 101 may be configured to (wired or wirelessly) communicate with the one or more current sensors 194 for detecting and processing the current drawn by any device in heat pump system 100 that consumes electrical energy. For example, one or more current sensors may be deployed to detect the current drawn by compressor 110, pumps 131, 132, reversing valve 160, motor that drives expansion valve 170, and the one or more motors that drive the one or more fans 180.

Heat pump system 100 is capable of matching the space heating, space cooling, and water heating demand by controlling the components of heat pump system 100 anywhere in the range of about 0% capacity to about 100% capacity of such components of heat pump system 100. For example, if controller 101 determines that the heat pump system 100 must deliver 23% of the capacity of compressor 110 to meet a given space conditioning (i.e., space heating or space cooling) demand, then the controller 101 may command the compressor 110 to function at 23% of its capacity.

Simultaneous water heating may also be provided by heat pump system 100. For example, controller 101 may be configured to use excess capacity of the compressor 110 by driving the compressor 110 to, for example, 33% of its capacity to provide 23% of its capacity to meet space conditioning (i.e., space heating or space cooling) needs and to provide 10% of its capacity to simultaneously meet the demand for domestic water heating. The compressor 110 may be called upon to run longer to provide the 10% domestic water heating. Heat pump system 100 enables space conditioning (i.e., space heating or space cooling) and simultaneous domestic water heating by continuously putting at least some heat energy into domestic water circulating through desuperheater heat exchanger 121.

If domestic water heating demand is high, heat pump system 100 can adjust the amount of water flowing through storage loop 135 to force full condensing of the refrigerant exiting the desuperheater heat exchanger 121. When fully condensing the refrigerant in this way, the condensed refrigerant may be evaporated by load heat exchanger 123 to provide space cooling concurrently with high volume domestic water heating (as shown in FIG. 6), or evaporated by source heat exchanger 122 to simply provide high volume domestic water heating alone (as shown in FIG. 7).

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The embodiments described herein are possible examples of implementations and are merely set forth for a clear understanding of the principles of the features described herein. Many variations and modifications may be made to the above-described embodiment(s) without substantially departing from the spirit and principles of the techniques, processes, devices, and systems described herein. All such modifications are intended to be included herein within the scope of this disclosure and protected by the following claims.

What is claimed is:

1. A heat pump system for conditioning air in a space, comprising:
a variable speed compressor configured to circulate a refrigerant through a refrigerant circuit;
a desuperheater heat exchanger positioned directly downstream of the compressor to receive the refrigerant from the compressor, wherein all of the refrigerant is conveyed via the refrigerant circuit through the desuperheater heat exchanger during operation of the heat pump system regardless of active status or inactive status of the desuperheater heat exchanger, the desuperheater heat exchanger operable as a desuperheater or a condenser;
a refrigerant-to-liquid source heat exchanger operable as either a condenser or an evaporator to exchange heat between the refrigerant and a heat exchange liquid;
a refrigerant-to-air load heat exchanger operable as either a condenser or an evaporator to exchange heat between the refrigerant and the air, the air conditioned thereby for use in the space;
a reversing valve disposed along the refrigerant circuit, the reversing valve including a first port configured to receive the refrigerant from the desuperheater heat exchanger, a second port connected to the variable speed compressor, a third port connected to the refrigerant-to-air load heat exchanger, and a fourth port connected to the refrigerant-to-liquid source heat exchanger; and
an expansion valve disposed on the refrigerant circuit and positioned between the refrigerant-to-liquid source heat exchanger and the refrigerant-to-air load heat exchanger,
wherein in a space cooling mode, the reversing valve is configured to convey the refrigerant from the first port to the fourth port and from the third port to the second port to cause the refrigerant to flow to the refrigerant-to-liquid source heat exchanger configured to operate as a condenser, through the expansion valve, and to the refrigerant-to-air heat exchanger configured to operate as an evaporator to cool the air for use in the space, and
wherein in a space heating mode, the reversing valve is configured to convey the refrigerant from the first port to the third port and from the fourth port to the second port to cause the refrigerant to flow to the refrigerant-to-air load heat exchanger configured to operate as a condenser, through the expansion valve, and to the refrigerant-to-liquid source heat exchanger configured to operate as an evaporator to heat the air for use in the space.

2. The heat pump system of claim 1, wherein the desuperheater heat exchanger is a coaxial heat exchanger.

3. The heat pump system of claim 1, wherein the refrigerant-to-liquid source heat exchanger is a coaxial heat exchanger.

4. The heat pump system of claim 1, including a fan driven by a variable speed motor, the fan configured to flow air over a portion of the refrigerant-to-air load heat exchanger.

5. The heat pump system of claim 1, wherein the desuperheater heat exchanger is a refrigerant-to-liquid heat exchanger configured to exchange heat between the refrigerant and domestic water in a storage loop, and the exchange of heat between the refrigerant and the domestic water is modulated by an amount of flow of the domestic water through the desuperheater heat exchanger.

6. The heat pump system of claim 5, including a storage tank for storing heated domestic water.

7. The heat pump system of claim 5, including a variable speed pump for circulating the domestic water in the storage loop and through the desuperheater heat exchanger.

8. The heat pump system of claim 1, wherein the refrigerant-to-liquid source heat exchanger is configured to exchange heat between the refrigerant and the heat exchange liquid in a source loop.

9. The heat pump system of claim 8, including a variable speed pump for circulating a liquid in the source loop and through the refrigerant-to-liquid source heat exchanger.

10. The heat pump system of claim 1, wherein the expansion valve is an electronically controlled thermostatic expansion valve.

11. The heat pump system of claim 1, including a controller comprising a processor and memory on which one or more software programs are stored, the controller configured to control operation of the reversing valve, the expansion valve, the compressor, a first variable speed pump for circulating water through the desuperheater heat exchanger, and a second variable speed pump for circulating the heat exchange liquid through the refrigerant-to-liquid source heat exchanger.

12. The heat pump system of claim 11, wherein to operate the system in a space heating mode, the controller is configured to:
control the first variable speed pump to disable heat exchange in the desuperheater heat exchanger while the refrigerant is conveyed via the refrigerant circuit through the desuperheater heat exchanger;
control the reversing valve to cause refrigerant flow from the desuperheater heat exchanger to the load heat exchanger acting as a condenser and to return flow from the source heat exchanger acting as an evaporator to the compressor;
control an opening in the expansion valve to cause refrigerant flow from the load heat exchanger, through the expansion valve, and to the source heat exchanger; and
control the second variable speed pump to enable heat exchange in the source heat exchanger.

13. The heat pump system of claim 11, wherein to operate the system in a space cooling mode, the controller is configured to:
control the first variable speed pump to disable heat exchange in the desuperheater heat exchanger while the refrigerant is conveyed via the refrigerant circuit through the desuperheater heat exchanger;
control the reversing valve to cause refrigerant flow from the desuperheater heat exchanger to the source heat exchanger acting as a condenser and to return flow from the load heat exchanger acting as an evaporator to the compressor;
control an opening in the expansion valve to cause refrigerant flow from the source heat exchanger, through the expansion valve, and to the load heat exchanger; and
control the second variable speed pump to enable heat exchange in the source heat exchanger.

14. The heat pump system of claim 11, wherein to operate the system in a space heating with desuperheater water heating mode, the controller is configured to:
control the first variable speed pump to enable heat exchange in the desuperheater heat exchanger to heat domestic water pumped through the desuperheater heat exchanger;
control the reversing valve to cause refrigerant flow from the desuperheater heat exchanger to the load heat exchanger acting as a condenser and to return flow from the source heat exchanger acting as an evaporator to the compressor, wherein the refrigerant flow from the desuperheater heat exchanger comprises desuperheated refrigerant;
control an opening in the expansion valve to cause refrigerant flow from the load heat exchanger, through the expansion valve, and to the source heat exchanger; and
control the second variable speed pump to enable heat exchange in the source heat exchanger.

15. The heat pump system of claim 11, wherein to operate the system in a space cooling with desuperheater water heating mode, the controller is configured to:
control the first variable speed pump to enable heat exchange in the desuperheater heat exchanger to heat domestic water pumped through the desuperheater heat exchanger;
control the reversing valve to cause refrigerant flow from the desuperheater heat exchanger to the source heat exchanger acting as a condenser and to return flow from the load heat exchanger acting as an evaporator to the compressor, wherein the refrigerant flow from the desuperheater heat exchanger comprises desuperheated refrigerant;
control an opening in the expansion valve to cause refrigerant flow from the source heat exchanger, through the expansion valve, and to the load heat exchanger; and
control the second variable speed pump to enable heat exchange in the source heat exchanger.

16. The heat pump system of claim 11, wherein to operate the system in a space cooling to water heating mode, the controller is configured to:
control the first variable speed pump to enable heat exchange in the desuperheater heat exchanger to heat domestic water pumped through the desuperheater heat exchanger;
control the reversing valve to cause refrigerant flow from the desuperheater heat exchanger acting as a condenser to the source heat exchanger configured in an inactive state and to return flow from the load heat exchanger acting as an evaporator to the compressor;
control an opening in the expansion valve to cause refrigerant flow from the source heat exchanger, through the expansion valve, and to the load heat exchanger; and
control the second variable speed pump to disable heat exchange in the source heat exchanger.

17. The heat pump system of claim 16, wherein the load heat exchanger is a refrigerant-to-air heat exchanger, and the controller is configured to control a variable speed motor to drive a fan to flow air over a portion of the load heat exchanger.

18. The heat pump system of claim 11, wherein to operate the system in a water heating mode, the controller is configured to:
control the first variable speed pump to enable heat exchange in the desuperheater heat exchanger to heat domestic water pumped through the desuperheater heat exchanger;
control the reversing valve to cause refrigerant flow from the desuperheater heat exchanger acting as a condenser to the load heat exchanger configured in an inactive state and to return flow from the source heat exchanger acting as an evaporator to the compressor;
control an opening in the expansion valve to cause refrigerant flow from the load heat exchanger, through the expansion valve, and to the source heat exchanger; and
control the second variable speed pump to enable heat exchange in the source heat exchanger.

* * * * *